(12) United States Patent
Suzuki et al.

(10) Patent No.: US 6,370,871 B2
(45) Date of Patent: *Apr. 16, 2002

(54) INTERNAL COMBUSTION ENGINE HAVING LEAN NOX CATALYST

(75) Inventors: Makoto Suzuki; Hideo Kobayashi, both of Mishima; Shinya Hirota, Susono; Toshiaki Tanaka, Numazu; Kotaro Hayashi, Mishima, all of (JP)

(73) Assignee: Toyota Jidosha Kabushiki Kaisha, Toyota (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/464,740

(22) Filed: Dec. 16, 1999

(30) Foreign Application Priority Data

Dec. 22, 1998 (JP) ............................. 10-365765

(51) Int. Cl.[7] ................................. F01N 3/00
(52) U.S. Cl. ..................... 60/286; 60/278; 60/280; 123/551
(58) Field of Search ................... 60/278, 284, 286, 60/287, 288, 280, 300, 301, 605.2, 599, 274, 303; 123/550, 551; 237/12.3 C

(56) References Cited

U.S. PATENT DOCUMENTS

| | | | |
|---|---|---|---|
| 3,775,971 A | * 12/1973 | Gadefelt | 60/278 |
| 3,986,350 A | * 10/1976 | Schmidt | 60/286 |
| 4,677,823 A | * 7/1987 | Hardy | 60/286 |
| 4,836,445 A | * 6/1989 | Okada | 237/12.3 C |
| 4,858,825 A | 8/1989 | Kawamura | |
| 4,927,077 A | 5/1990 | Okada | |
| 5,052,178 A | * 10/1991 | Clerc et al. | 60/288 |
| 5,379,592 A | * 1/1995 | Waschkuttis | 60/300 |
| 5,381,659 A | * 1/1995 | Loving et al. | 60/286 |

(List continued on next page.)

FOREIGN PATENT DOCUMENTS

| | | |
|---|---|---|
| DE | 4411959 A1 | 10/1995 |
| EP | 0283240 | * 9/1988 |
| FR | 1497428 | 1/1967 |
| FR | 2381175 | 9/1978 |
| GB | 2041081 A | 9/1980 |
| GB | 1595060 | 8/1981 |
| GB | 2134408 | * 8/1984 |
| JP | 55160158 A | 12/1980 |
| JP | 6078819 A | 5/1985 |
| JP | 6177225 A | 4/1994 |
| JP | 6222867 A | 8/1994 |

OTHER PUBLICATIONS

Co–pending U.S. Patent Application Serial No. 09/213,051, filed Dec. 16, 1998.

Primary Examiner—Thomas Denion
Assistant Examiner—Tu M. Nguyen
(74) Attorney, Agent, or Firm—Kenyon & Kenyon

(57) ABSTRACT

An internal combustion engine having a lean NOx catalyst is capable of relieving a load upon an engine fuel injection device by eliminating the use of sub-injection, and of well purifying an exhaust gas and recovering from S-poisoning even by eliminating the use of the sub-injection. The internal combustion engine has a combustion heater for allowing a flow of combustion gas through an engine intake passageway to raise temperatures of engine related elements, a lean NOx catalyst, provided in an engine exhaust passageway, for purifying an engine exhaust gas, and a combustion gas introducing passageway for introducing at least some proportion of a combustion gas emitted by the combustion heater, toward upstream of the lean NOx catalyst in the engine exhaust passageway from the engine intake passageway when making a request for a reproducing process of the lean NOx catalyst.

10 Claims, 15 Drawing Sheets

U.S. PATENT DOCUMENTS

| | | | |
|---|---|---|---|
| 5,586,433 A | * 12/1996 | Boegner et al. | 60/286 |
| 5,701,735 A | * 12/1997 | Kawaguchi | 60/303 |
| 5,802,844 A | * 9/1998 | Lee et al. | 60/286 |
| 5,823,170 A | * 10/1998 | Sienicki | 123/551 |
| 5,910,097 A | * 6/1999 | Boegner et al. | 60/286 |
| 5,950,420 A | * 9/1999 | Geiger | 60/278 |
| 5,974,791 A | * 11/1999 | Hirota et al. | 60/303 |
| 6,220,522 B1 | * 4/2001 | Suzuki | 237/12.3 C |
| 6,253,545 B1 | * 7/2001 | Suzuki | 60/278 |
| 6,266,956 B1 | * 7/2001 | Suzuki | 60/278 |

* cited by examiner

INTERNAL COMBUSTION ENGINE HAVING LEAN NOX CATALYST

BACKGROUND OF THE INVENTION

1. Field of the Invention

The present invention relates generally to an internal combustion engine having a lean NOx catalyst and, more particularly, to an internal combustion engine having a lean NOx catalyst which is provided in an exhaust system of the internal combustion engine in which the atmospheric air in the exhaust system becomes especially an oxygen excessive state, for purging nitrogen oxide contained in an exhaust gas in this exhaust system by use of a reducing agent.

2. Description of the Prior Art

For example, an occlusive reduction type lean NOx catalyst may be exemplified as a catalyst used in an internal combustion engine such as a gasoline direct injection lean-burn engine, a diesel engine and the like exhibiting a high thermal efficiency in which the atmospheric air in an exhaust system is in an oxygen excessive state while quantities of hydrocarbon and carbon monoxide are small.

The occlusive reduction type lean NOx catalyst may be classified as an intermittent processing type lean NOx catalyst for temporarily occluding the nitrogen oxide to the catalyst in the lean atmospheric air, and promptly reducing and purging the nitrogen oxide occluded by supplying a proper amount of reducing agent to the catalyst in the reduction atmospheric air afterward.

Note that there is a selective reduction type lean NOx catalyst other than the occlusive reduction type lean NOx catalyst.

The selective reduction type lean NOx catalyst is categorized as a consecutive processing type lean NOx catalyst for consecutively selectively reducing and purging the nitrogen oxide by supplying the reducing agent to the catalyst. Further, the hydrocarbon may be exemplified as the reducing agent as disclosed in, e.g., Japanese Patent Application Laid-Open Publication No. 6-117225. Carbon monoxide in addition to the hydrocarbon is also known as the reducing agent.

When the hydrocarbon is used as the reducing agent, the hydrocarbon is partially oxidated to generate active species. Then, the active species react to the nitrogen oxide and reduce it, thereby generating nitrogen, water and carbon dioxide which are not harmful to the human body.

Then, according to the above-mentioned Publication, an engine fuel injection device normally used in the internal combustion engine, such as an injector, for the supply of fuel at a compression stroke, is also used for supplying the reducing agent by injection at expansion stroke through exhaust stroke. Of these injections, the former injection for driving the engine is termed a main injection, while the latter injection is called a sub-injection.

Further, activation of the lean NOx catalyst is needed for making the lean NOx catalyst function effectively. For activating the lean NOx catalyst, the lean NOx catalyst must be warmed up to above an activation temperature enough to function effectively. Then, according to the conventional technology, the catalyst temperature is raised to the activation temperature or higher by utilizing the heat of an exhaust gas emitted by the internal combustion engine.

The sub-injection is, as described above, conducted at the expansion stroke through exhaust stoke, and is therefore effected at a point of time when the piston moves more downward than a top dead center.

It is preferable in terms of performing the combustion that the fuel is injected when the piston is in the vicinity of the top dead center. Then, for attaining this, the fuel injection device is installed at a fixed injection angle. Therefore, the fuel is hard to vaporize in such a sub-injection that the fuel is injected when the piston is at a point lower than the top dead center of the stroke thereof. It might be therefore presumed that the as-liquefied fuel could be supplied as the reducing agent to the lean NOx catalyst.

It is more preferable for effectively utilizing the fuel as the reducing agent to vaporize the fuel than to liquefy the fuel. It is, however, difficult to well catch a timing for executing the sub-injection so as to vaporize the fuel in the fuel injection device such as the injector of which the original function is to inject the combustion-oriented fuel for driving the engine. Hence, there is desired a technology capable of supplying the as-vaporized reducing agent to the lean NOx catalyst without effecting the sub-injection.

According to the conventional technology, the lean NOx catalyst effectively functions after starting up the engine, at which time the Lean NOx catalyst can reach the activation temperature or higher. The lean NOx catalyst can not be warmed up to above the activation temperature in a stop state before starting up the engine.

Further, even after the start-up of the engine, it takes a considerable length of time till the lean NOx catalyst is activated, and during such period of time the lean NOx catalyst does not effectively function. Besides, in the internal combustion engine such as the direct injection engine and the diesel engine exhibiting the high thermal efficiency, when the internal combustion engine is in an operation state such as, e.g., in a light-load region, an exhaust temperature at that time is low, and hence the heat enough to activate the lean NOx catalyst is not transferred throughout the exhaust system due to the low exhaust temperature. Consequently, it might occur that the lean NOx catalyst is rather cooled by the low-temperature exhaust gas of the internal combustion engine, for example, during a deceleration after the acceleration.

Then, it becomes difficult to perform a recovery from so-called SOx-poisoning and a recovery from SOF(Soluble Organic Fraction)-poisoning of the lean NOx catalyst, and besides it is also difficult to remove particulate matters. Note that poisonings by sulfur without being limited to the SOx-poisoning are generically termed S-poisoning. Further, as known well, the SOF-poisoning is not defined as the poisoning caused by sulfur and does not therefore come under the category of the S-poisoning.

On the other hand, if an external load is applied to the internal combustion engine by executing intake/exhaust throttling operations in order to enrich the atmospheric air in the exhaust system with a rise in the exhaust temperature, this might in turn cause a deteriorated fuel consumption and lead to a production of particulate matters.

Further, though not disclosed in the above-mentioned Publication, the internal combustion engine is provided with a combustion heater of such a type as to effect the air suction from the atmospheric air in order to enhance a car room warming performance and an engine warp-up performance in some cases. The combustion gas emitted from the combustion heater is discharged to an exhaust passageway, and it can be considered that the lean NOx catalyst provided in the exhaust passageway is thereby activated. In that case, however, in a state where the internal combustion engine is driven, an exhaust pressure in the internal combustion engine is higher than an exhaust pressure in the combustion heater. Therefore, the combustion gas from the combustion heater can not be discharged to the exhaust passageway. Hence, it is impossible to effectively utilize the heat of the combustion gas from the combustion heater for warming up the lean NOx catalyst. Further, because of a differential pressure between the exhaust pressure in the internal combustion engine and the exhaust pressure in the combustion heater, it might occur that the engine exhaust gas flows back to the combustion heater via a combustion gas discharge passageway for discharging the combustion gas from the combustion heater to outside. Note that the combustion gas from the combustion heater and the exhaust gas emitted by the internal combustion engine are hereinafter simply called the combustion gas and the exhaust gas, respectively, unless otherwise specified.

SUMMARY OF THE INVENTION

It is a primary object of the present invention, which was devised under such circumstances to obviate the above problems, to provide an internal combustion engine having a lean NOx catalyst, which can provide the effects, for example, as described below.

① Capable of sufficiently supplying the lean NOx catalyst with a reducing agent such as hydrocarbon even by eliminating the necessity of a sub-injection.

② Sufficiently raising a temperature in the exhaust system from before starting up the engine so that the lean NOx catalyst provided in the exhaust system of the internal combustion engine functions effectively with the start of the internal combustion engine.

③ Well performing purification of the exhaust gas, recovery from S-poisoning or SOF-poisoning of the lean NOx catalyst and removal of particulate matters.

④ Restraining production of the particulate matters.

⑤ Speeding up activation of the lean NOx catalyst by allowing the combustion gas through the exhaust passageway according to the necessity while preventing a back flow to the combustion heater even after the start-up of the engine.

To accomplish the above object, an internal combustion engine having a lean NOx catalyst according to the present invention adopts the following constructions.

According to a first aspect of the present invention, an internal combustion engine having a lean NOx catalyst, comprises a combustion heater for raising temperatures of engine related elements, a lean NOx catalyst provided in an engine exhaust passageway for purifying an engine exhaust gas, and a combustion gas introducing passageway for introducing a combustion gas emitted by the combustion heater, toward upstream of the lean NOx catalyst in the engine exhaust passageway when a request for a reproducing process of the lean NOx catalyst is made.

Herein, "the engine related elements" imply elements of the internal combustion engine itself such as engine cooling water, a cylinder block, a cylinder head and the like.

"The engine" given herein may include internal combustion engines such as not only a typical port injection gasoline engine but also a gasoline direct injection lean-burn engine and a diesel engine or a CNG (Compressed Natural Gas) engine.

"The combustion heater" is preferably attached to the internal combustion engine as a separate member from the internal combustion engine body. It is because the combustion of the heater is conducted independently without being influenced at all by the combustion within cylinders of the internal combustion engine body, and, if the combustion gas emitted at that time can be discharged to the engine exhaust system, the combustion gas can be utilized for increasing a temperature in the engine exhaust system and for executing catalyst processing even before starting up the engine.

"The lean NOx catalyst" may be the occlusive reduction type lean NOx catalyst or the selective reduction type lean NOx catalyst.

"The combustion gas" may preferably contain, as its component, hydrocarbon and carbon monoxide as the necessity may arise. It is therefore preferable that fuels for the internal combustion engine such as a gasoline and a light oil are used as fuels for combustion in the combustion heater. This is because the gasoline and the like produce an unburned gas if not completely burned, and the unburned gas contains the hydrocarbon and the carbon monoxide serving as reducing agents.

"The combustion gas introducing passageway" is a passageway used only for warming the lean NOx catalyst without permitting the heat to escape during passing of the combustion gas through this passageway, and it is preferable that the combustion gas introducing passageway is a passageway for guiding the combustion gas to the exhaust system while by passing the cylinders of the internal combustion engine. Note that the heat of the combustion gas will hereinafter be called combustion gas heat, unless otherwise specified.

In the internal combustion engine having the lean NOx catalyst according to the present invention, when the request for the reproducing process of the lean NOx catalyst is made, the combustion gas flows toward the upstream-side of the lean NOx catalyst via the combustion gas introducing passageway. Accordingly, if the combustion gas heat at that time is high, the temperature of the lean NOx catalyst is increased by the high-heat combustion gas having arrived there and is thereby activated irrespective of the operating or non-operating of the internal combustion engine.

Besides, if a state of the combustion in the combustion heater is adjusted so that the combustion gas contains proper quantities of hydrocarbon and carbon monoxide, it is feasible to ensure the hydrocarbon and the carbon monoxide serving as the reducing agents enough to purify the exhaust gas and effect the reduction of the lean NOx catalyst and recovery from the S-poisoning without, requiring the sub-injection which has hitherto been used. Accordingly, if the combustion heater has been operated from the time when the engine was in the stop state, the exhaust gas can be, as a matter of course, purified effectively immediately after starting up the internal combustion engine, and there can be also amply expected the reduction of the lean NOx catalyst and the recovery from the S-poisoning thereof.

Further, when the combustion heater is used for the purpose of raising the temperature in the exhaust system in order to activate the catalyst, the external load may not be applied to the internal combustion engine unlike the prior art, and consequently there must be a less amount of unburned gas produced. Therefore, the particulate matters can be restrained from being produced. Then, even if the SOF-poisoning occurs in the lean NOx catalyst or the particulate matters adhered thereto, the soluble organic fractions (SOF) and the particulate matters can be burned by increasing the combustion gas heat, and it is therefore feasible to make the recovery from the SOF-poisoning of the lean NOx catalyst and remove the particulate matters.

According to a second aspect of the invention, in the internal combustion engine having the lean NOx catalyst according to the first aspect, the time when making the request for the reproducing process of the lean NOx catalyst is at least one of the times of a time when requiring a NOx reduction of the lean NOx catalyst, a time when requiring recovery from S-poisoning of the lean NOx catalyst or recovery from SOF-poisoning thereof, and a time when requiring removal of particulate matters from the lean NOx catalyst.

According to a third aspect of the invention, in the internal combustion engine having the lean NOx catalyst according to the first aspect, the combustion gas introducing passageway may also be an EGR (Exhaust Gas Recirculation) passageway. Note that the EGR passageway essentially serves to re-circulate the exhaust gas of the internal combustion engine from an exhaust passageway to an intake passageway in order to flow some proportion of the exhaust gas back to an intake system for lowering generation of NOx.

In the internal combustion engine having the lean NOx catalyst according to the present invention, the EGR passageway, if applied as the combustion gas introducing passageway when the engine stops, is defined as an existing structure in the internal combustion engine, and hence there is no necessity for newly providing the combustion gas introducing passageway. With this structure, the whole apparatus does not become complicated in configuration, and besides the costs can be reduced.

According to a fourth aspect of the invention, in the internal combustion engine having the lean NOx catalyst according to the first aspect, the combustion gas introducing passageway may be a bypass passageway extending to a point anterior to the lean NOx catalyst in the engine exhaust passageway and bypassing the engine body.

In the internal combustion engine having the lean NOx catalyst according to the present invention, the combustion gas emitted from the combustion heater can be flowed directly to the point anterior to the catalyst converter, i.e., in close proximity to the lean NOx catalyst via the bypass passageway. Therefore, the combustion gas heat can be utilized effectively without any waste for activating the lean NOx catalyst. Further, if the combustion gas introducing passageway is structured as an heat insulated passageway, the combustion gas heat can be utilized solely for warming the catalyst by preventing the heat held by the combustion gas from escaping somewhere during the passing of the combustion gas through the combustion gas introducing passageway. Consequently, the lean NOx catalyst can be warmed further effectively. Accordingly, the exhaust gas can be purified much sooner corresponding thereto, and it is feasible to make the NOx reduction of the lean NOx catalyst and the recovery from the S-poisoning or SOF-poisoning from the lean NOx catalyst, and to remove the particulate matters. That is, the lean NOx catalyst can be reproduced preferably by setting the temperature of the lean NOx catalyst so as to become suitable for the recoveries from the above poisonings and the removable of the particulate matters.

According to a fifth aspect of the invention, in the internal combustion engine having the lean NOx catalyst according to the second aspect, wherein when requiring the NOx reduction of the lean NOx catalyst, and when requiring the recovery from the S-poisoning of the lean NOx catalyst, an air-fuel ratio of the combustion gas may be enriched as in the case of the lean NOx catalyst being in the reduction atmospheric air. The reduction atmospheric air connoted herein is the atmospheric air containing large quantities of hydrocarbon and carbon monoxide serving as the reducing agents for the lean NOx catalyst.

In the internal combustion engine having the lean NOx catalyst according to the present invention, when increasing a quantity of fuel supply to the combustion heater, the air-fuel ratio of the combustion gas becomes rich, and the combustion gas heat rises. Besides, the exhaust gas comes to contain a greater amount of reduction gas components such as the hydrocarbon and the carbon monoxide. Hence, it is possible to make the NOx reduction of the lean NOx catalyst and recovery from the S-poisoning thereof.

According to a sixth aspect of the invention, in the internal combustion engine having the lean NOx catalyst according to the first aspect, wherein when a differential pressure between a pressure of an engine intake system and a pressure of an engine exhaust system is at a predetermined value or larger, the combustion gas emitted from the combustion heater may be flowed to the combustion gas introducing passageway. Note that "the predetermined value" is a value with which the pressure of the engine intake system is higher than the pressure of the engine exhaust system when operating the combustion heater in the state where the above differential pressure is over the predetermined value, and hence the combustion gas from the combustion heater is allowed to flow toward the engine exhaust system, i.e., a value with which a back flow does not occur.

According to a seventh aspect of the invention, the internal combustion engine having the lean NOx catalyst according to the first aspect, may further comprise a supercharger, wherein when the pressure of the engine intake system becomes equal to or above the predetermined value by dint of supercharging of the supercharger, the combustion gas emitted from the combustion heater is flowed to the combustion gas introducing passageway. "The predetermined value" in this case, is substantially the same as the predetermined value according to the sixth aspect of the invention. Namely, this is a value with which the pressure of the engine intake system is higher than the pressure of the engine exhaust system when operating the combustion heater in the state where the pressure in the engine intake system is equal to or above the predetermined value, and hence the combustion gas from the combustion heater is allowed to flow toward the engine exhaust system, i.e., a value with which a back flow does not occur.

In the internal combustion engine having the lean NOx catalyst according to the present invention, the internal combustion engine is provided with the supercharger, e.g., a turbo charger, and the pressure in the intake system is raised higher by operating a compressor thereof than an exhaust pressure at a point, anterior to the lean NOx catalyst, of the exhaust passageway, to which to the combustion gas is introduced. With this structure, the high-heat combustion gas can be supplied in bypass to the lean NOx catalyst via the combustion gas introducing passageway.

Hence, in the case of the internal combustion engine provided with no turbo charger, even when executing such an engine operation that the pressure in the exhaust system becomes higher than the pressure in the intake system, and if the internal combustion engine comes under such an engine having the supercharger, in particular, the turbo charger as in the case of the present invention, the intake system pressure is raised higher than the exhaust system pressure by operating the compressor. Therefore, the high-heat combustion gas can be supplied to anterior to the lean NOx catalyst via the combustion gas introducing passageway. Accordingly, even after starting up the engine, the combustion gas can be flowed to the exhaust passageway according to the necessity, thereby speeding up the activation of the lean NOx catalyst.

In the case of the internal combustion engine having the turbo charger, the pressure in the intake system may be conceived as a pressure at a point positioned more downstream than the portion provided with the compressor of the turbo charger. Further, the pressure in the exhaust system may be conceived as a pressure at a point positioned more downstream than the portion provided with the turbine of the turbo charger and anterior to the lean NOx catalyst. Note that during the operation of the engine in which the EGR passageway performs its original function as the exhaust gas re-circulation device, the EGR passageway is not, as a matter of course, used as the combustion gas introducing passageway. Further, the "time when the pressure in the engine intake system becomes above the predetermined value" may be in other words "a time when the differential pressure between the pressure in the engine intake system and the pressure in the engine exhaust system becomes above the predetermined value."

According to an eighth aspect of the invention, in the internal combustion engine having the lean NOx catalyst according to the first aspect, wherein when making the request for the reproducing process of the lean NOx catalyst, an output of the combustion heater may become larger than an output thereof that was before making the request for the reproducing process of the lean NOx catalyst so as to increase heat of the combustion gas emitted from the combustion heater. For increasing the output of the combustion heater so that a thermal energy augments, the flames produced by the combustion heater may be grown by increasing the quantities of the air or the fuel fed into the combustion heater.

According to a ninth aspect of the invention, in the internal combustion engine having the lean NOx catalyst according to the first aspect, wherein the exhaust passageway includes a catalyst bypass pipe bypassing the lean NOx catalyst, and an exhaust gas flow diverging device for diverging a flow of the exhaust gas to the catalyst bypass pipe and to the lean NOx catalyst, the exhaust gas flow diverging device permitting the flow of the exhaust gas to the catalyst bypass pipe if a temperature of the exhaust gas is lower than an activation temperature of the lean NOx catalyst when making the request for the reproducing process of the lean NOx catalyst.

Furthermore, what is preferable as the exhaust gas flow diverging device may be an opening/closing valve for enabling an opening of the catalyst bypass pipe to open and close. Then, a CPU (Central Processing Unit) of an ECU (Engine Control Unit) controls an operation of the opening/closing valve.

According to a tenth aspect of the invention, in the internal combustion engine having the lean NOx catalyst according to the ninth aspect, wherein, of connecting points of the catalyst bypass pipe to the engine exhaust passageway which are formed when the catalyst bypass pipe bypasses the lean NOx catalyst, the connecting point positioned upstream may be provided with the exhaust gas flow diverging device, and a connecting point more downstream than the connecting point where the exhaust gas flow diverging device is provided in the engine exhaust passageway may be connected with the combustion gas introducing passageway which leads the combustion gas emitted from the combustion heater toward upstream of the lean NOx catalyst in the engine exhaust passageway at the time of requesting the reproducing process of the lean NOx catalyst. This geometry intends to transfer, without any waste, the heat of the combustion gas flowing to the exhaust passageway along the combustion gas introducing passageway, to the catalyst.

In the internal combustion engine having the lean NOx catalyst according to the present invention, the exhaust passageway includes the catalyst bypass pipe which bypasses the lean NOx catalyst. The exhaust gas flow diverging device diverges the flow of the exhaust gas toward the catalyst bypass pipe and toward the lean NOx catalyst in the exhaust pipe.

As for this flow-divergence, the exhaust gas is allowed to flow to the catalyst bypass pipe in such a case that the temperature of the exhaust gas is lower than the activation temperature of the lean NOx catalyst when making the request for the reproducing process of the lean NOx catalyst. That is, in the case of the low temperature of the exhaust gas, the exhaust gas flow diverging device cuts off the flow of the exhaust gas toward the lean NOx catalyst but permits the flow thereof toward the catalyst bypass pipe. Hence, only the high-heat combustion gas can be flowed to the lean NOx catalyst via the combustion gas introducing passageway.

With this structure, even when the temperature of the exhaust gas is low, this low-temperature exhaust gas can be prevented from flowing into the lean NOx catalyst. Hence, it never occurs that the temperature of the lean NOx catalyst is decreased by the low-temperature exhaust gas. As a result, the lean NOx catalyst can be easily activated. Further, the catalyst temperature can be sufficiently raised up to the temperature enough to burn the SOF and the particulate matters at a high efficiency, and hence there can be well done the NOx reduction of the lean NOx catalyst, recovery from the S-poisoning or from the SOF-poisoning, and also removal of the particulate matters.

According to an eleventh aspect of the invention, in the internal combustion engine having the lean NOx catalyst according to the first aspect, wherein the exhaust passageway may include at least two or more of the lean NOx catalysts, disposed in parallel to one another in a longitudinal direction of the exhaust passageway, to which the flow of the exhaust gas diverges alternately, and an exhaust gas flow diverging device for diverging the flow of the exhaust gas to the lean NOx catalysts. It is preferable that the exhaust gas flow diverging device cuts off the flow of the exhaust gas to the lean NOx catalyst which is in a state of requiring the reproducing process, among those lean NOx catalysts. Note that one end of the combustion gas introducing passageway may branch off in the form of duplex passageways each provided with an opening/closing valve, and may be connected with each lean NOx catalyst via this opening/closing valve.

Further, if none of the plurality of lean NOx catalysts requires the reproducing process, the exhaust gas is not flowed simultaneously to the plurality of lean NOx catalysts but that the exhaust gas is, in the case of, e.g., providing two lean NOx catalysts, flowed to only one catalyst by operating the exhaust gas flow diverging device but is not flowed to the other catalyst until the above-mentioned one catalyst comes to a state of requiring the reproducing process. Then, when one catalyst becomes the state of making the request for the reproducing process, the exhaust gas flow diverging device is operated reversely to the previous operation this time, thereby flowing the exhaust gas to only the other catalyst. Subsequently, at that time, in one catalyst converter, the combustion gas heat is transferred by opening the opening/closing valve related to one catalyst converter, and the reproducing process of one catalyst converter is carried out. At this time, the opening/closing valve related to the other catalyst converter is kept closed.

Next, when the other catalyst converter becomes the state of making the request for reproducing process, the exhaust gas flow diverging device is operated, thereby preventing the exhaust gas from flowing to the other catalyst converter.

Simultaneously, the exhaust gas is flowed to only one catalyst converter which has already done the process, and the combustion gas heat is transferred to the other catalyst converter by opening the opening/closing valve related to the other catalyst converter, and the reproducing process of the other catalyst converter is executed.

Thus, of the plurality of catalyst converters, the catalyst converter having come to the state of making the request for the reproducing process is set to non-operating, i.e., does not receive the inflow of the exhaust gas, while the other catalyst converter purifies the exhaust gas, and hence the exhaust gas purifying process can be done with no interruption. It is therefore feasible to carry out the emission and purify the exhaust gas at a high efficiency.

According to a twelfth aspect of the invention, in the internal combustion engine having the lean NOx catalyst according to the first aspect, wherein the combustion heater may allow the flow of the combustion gas through the engine intake passageway.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Other objects and advantages of the present invention will become apparent from the following discussion in conjunction with the accompanying drawings, in which.

DESCRIPTION OF THE PREFERRED EMBODIMENTS

Figure 1:
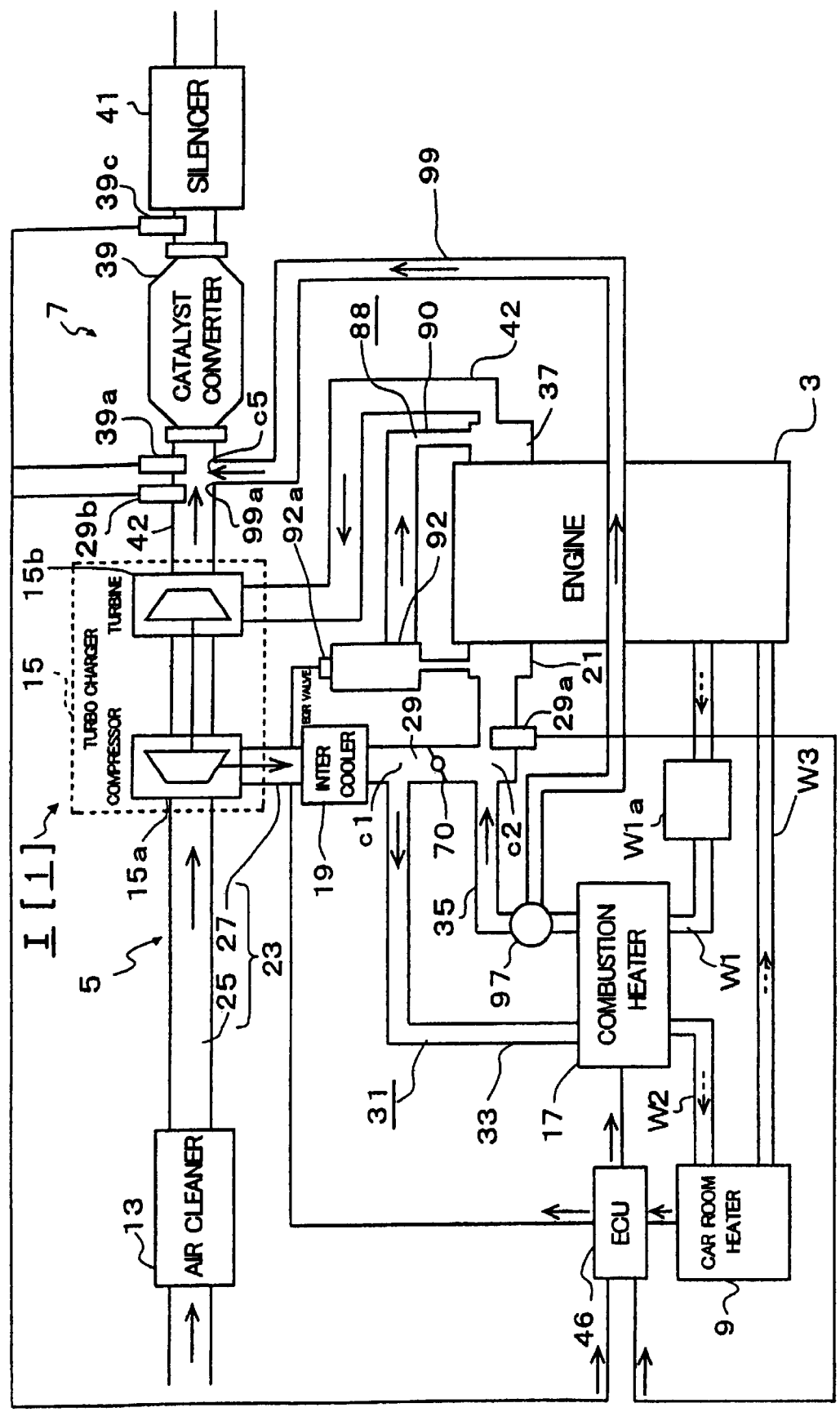
FIG. 1 is a diagram schematically illustrating a construction of an internal combustion engine having a lean NOx catalyst in a first embodiment of the present invention.

Embodiments of an internal combustion engine having a lean NOx catalyst according to the present invention will hereinafter be described with reference to the accompanying drawings.

First Embodiment

A first embodiment of the present invention will be discussed referring to FIGS. 1–4.

Diesel Engine I

A diesel engine I serving as an internal combustion engine includes an engine body 3 equipped with a water jacket containing the engine cooling water, an air intake device 5 for supplying a plurality of unillustrated engine cylinders of the engine body 3 with the air needed for combustion, an exhaust device 7 for discharging into the atmospheric air an exhaust gas produced after an air-fuel mixture has been burned, and a car room heater 9 for warming the interior of a room of a vehicle mounted with the engine. Note that the diesel engine is referred to simply as an engine, unless otherwise specified.

Air Intake Device 5

The air intake device 5 structurally starts with an air cleaner 13 for taking the filtered air into the engine cylinders and terminates with an unillustrated intake port within the engine body 3. From the air cleaner 13 down to the intake port, the air intake device 5 is provided with a compressor 15a of a turbo charger 15 which is a supercharger, an inter cooler 19, and an intake manifold 21 for distributing the air flowing in via the inter cooler 19 to the respective engine cylinders. The constructive members of the air intake device 5 are connected to one another through a plurality of connecting pipes belonging to the intake pipe 23 serving as an intake passageway.

Intake Pipe 23

The intake pipe 23 is roughly divided at the compressor 15a into a downstream-side connecting pipe 27 brought into a pressurized state because of the suction air entering the air intake device 5 being forcibly intruded, and an upstream-side connecting pipe 25 not brought into the pressurized state.

Upstream-Side Connecting Pipe 25

The upstream-side connecting pipe 25 may be categorized as a connecting pipe extending straight on bilateral directions between the air cleaner 13 and the compressor 15a as shown in FIG. 1.

Downstream-Side Connecting Pipe 27

The downstream-side connecting pipe 27 is constructed of a mainstream pipe 29, taking substantially an L-shape and extending in up-and-down directions in FIG. 1, for connecting the compressor 15a to the intake manifold 21, and of a branch pipe 31 for heater as a tributary pipe connected in bypass to the mainstream pipe 29.

Branch Pipe 31 for Heater

The branch pipe 31 for heater embraces the combustion heater 17 disposed midways of this pipe 31. The branch pipe 31 for heater is constructed of an air supply passageway 33 for supplying the combustion heater 17 with the air as well as for connecting an upstream-side portion of the combustion heater 17 to the mainstream pipe 29, and of a combustion gas discharge passageway 35 for discharging a combustion gas emitted from the combustion heater 17 into the mainstream pipe 29 as well as for connecting a downstream-side portion of the combustion heater 17 to the mainstream pipe 29. Further, with respect to individual connecting points C1, C2 of the mainstream pipe 29 respectively connected with of the air supply passageway 33 and the combuston gas introducing passageway 35, the connecting point C1 is disposed more upstream than the connecting point C2. Then, a three-way valve 97 is provided at a portion, closer to the combustion heater 17, of the combustion gas discharge passageway 35. A combustion gas introducing passageway 99 extends from the three-way valve 97 up to a point just anterior to a catalyst converter 39 of the exhaust device 7, which will hereinafter be explained. A description of the combustion gas introducing passageway 99 will be given after the explanation of the exhaust device 7.

Components Peripheral to Connecting Points C1 and C2

Further, the inter cooler 19 is provided between the connecting point C1 and the compressor 15a, and an intake throttle valve 70 is provided between the connecting points C1 and C2 along the mainstream pipe 29. In addition, an intake air pressure sensor 29a is fitted downstream of the intake throttle valve 70, i.e., fitted to a portion, positioned downstream of the compressor 15a, of the mainstream pipe 29. The intake air pressure sensor 29a measures an intake air pressure at the point, located downstream of the compressor 15a, of the mainstream pipe 29, the intake air pressure detected by the intake air pressure sensor 29a is converted into an electric signal and then transmitted to an ECU 46.

Inter Cooler 19

The inter cooler 19 cools off the air which receives the heat from the compressor 15a and existing more downstream than a portion provided with the compressor 15a.

Intake Throttle Valve 70

An unillustrated CPU of the ECU 46 controls an operation of the intake throttle valve 70. Further, the intake throttle valve 70 throttles the mainstream pipe 29 when the engine I is in a stop state and when the combustion heater 17 needs to be operated. In a case where the three-way valve 97 and the combustion gas introducing passageway 99 are provided, however, the combustion heater 17 can be operated when the engine stops even if the intake throttle valve 70 is not provided. Further, the operation of the engine I, i.e., the diesel engine, is positively stopped by throttling the intake throttle valve 70. The intake throttle valve 70 is structured to open just when and after starting up the engine I.

The inlet air flowing through the mainstream pipe 29 is separated into the inlet air diverging, at the connecting point C1, to the branch pipe 31 for heater, and the inlet air flowing downstream directly through the mainstream pipe 29 without diverging. Then, the diverging inlet air entering the branch pipe 31 for heater flows via the air supply passageway 33—the combustion heater 17—the combustion gas discharge passageway 35, and in the meantime receives the heat from the combustion heater 17, thus bearing the high heat. The high-heat inlet air flows to the connecting point C2 where it returns to the mainstream pipe 29 and joins with the inlet air which did not diverge at the connecting point C1, thereby functioning to increase a temperature of the inlet air entering the engine body 3.

Exhaust Device 7

The exhaust device 7 structurally starts with an unillustrated exhaust port in the engine body 3 and terminates with a silencer 41. From the exhaust port down to the silencer 41, the exhaust device 7 is provided with an exhaust manifold 37, a turbine 15b of the turbo charger 15 and the catalyst converter 39 containing an occlusive reduction type lean NOx catalyst for purifying the exhaust gas of the engine I along an exhaust pipe 42 serving as an exhaust passageway. It is to be noted that the occlusive reduction type lean NOx catalyst is hereinafter simply called a "lean NOx catalyst", unless otherwise specified. It is also noted that the catalyst converter 39 is structured such that a proper casing is filled with the lean NOx catalyst, and, therefore, it may be referred to as the lean NOx catalyst in use.

Furthermore, an inlet NOx sensor 39a and an outlet NOx sensor 39c are attached to portions, in the vicinity of both ends of the inlet and outlet of the catalyst converter 39, of the exhaust pipe 42. These sensors 39a, 39c are electrically connected to the ECU 46. It can be recognized from a difference between values detected by the inlet NOx sensor 39a and the outlet NOx sensor 39c whether the lean NOx catalyst is at a reduction time or not.

Combustion Gas Introducing Passageway 99

The combustion gas introducing passageway 99 serves to flow the combustion gas, after it has flowed via the three-way valve 97 from the combustion heater 17, toward the exhaust pipe 42 without allowing the same gas passing through the engine body 3. Namely, the combustion gas introducing passageway 99 is a bypass passageway, bypassing the engine body 3, through which to connect the intake pipe 23 serving as an intake passageway to the exhaust pipe 42 serving as an exhaust passageway. Then, a connecting point C5 of the combustion gas introducing passageway 99 to the exhaust pipe 42 is disposed anterior to the catalyst converter 39.

Hence, when the combustion heater 17 is operated irrespective of driving or non-driving of the engine I, the catalyst converter 39 can be warmed directly by the combustion gas arriving at the connecting point C5 via the combustion gas introducing passageway 99. Further, the combustion gas introducing passageway 99 can be utilized only for warming the catalyst converter 39 during the passing of the combustion gas through the combustion gas introducing passageway 99 by preventing the combustion heat from escaping therefrom. Note that the three-way valve 97 will be described in greater detail after giving a description of the combustion heater 17. Further, an exhaust gas pressure sensor 29b is provided in the vicinity of an outlet 99a of the combustion gas introducing passageway 99. The exhaust gas pressure sensor 29b is also electrically connected to the ECU 46. The exhaust gas pressure sensor 29b measures an exhaust gas pressure at the outlet 99a of the combustion gas introducing passageway 99. The exhaust gas pressure detected by the exhaust gas pressure sensor 29b is converted into an electric signal and then transmitted to the ECU 46.

EGR 88

The engine body 3 is provided with an EGR (Exhaust Gas Recirculation) device 88 which is an exhaust gas re-cycling device for flowing some of the exhaust gas back to the intake system. The EGR 88 has an EGR passageway 90 for connecting in bypass the exhaust manifold 37 of the exhaust pipe 42 and the intake manifold 21 of the intake pipe 23, to unillustrated cylinders of the engine body 3.

The EGR passageway 90 has an EGR valve 92 for controlling a quantity of a gas flowing through this EGR passageway 90.

The EGR valve 92 is electrically connected to the CPU of the ECU 46, and is driven by an electric motor 92a. The EGR valve 92 is a valve constructed to originally open under the control of the CPU as the necessity may arise when the engine I is in the operating state, and is a variable controllable valve which opens also when the engine I is in the stop state and when required to operate the combustion heater 17. Further, the EGR valve 92 may also be called an introduction mechanism for introducing the combustion gas emitted from the combustion heater 17 to the catalyst converter 39 via the EGR passageway 90. Note that the combustion gas emitted from the combustion heater 17 is hereinafter referred to as the combustion gas, unless otherwise specified.

As described above, the EGR valve 92 opens when the engine I is in the stop state and when required to operate the combustion heater 17, at which time the combustion gas is flowed from the intake pipe 23 to the exhaust pipe 42 via the EGR passageway 90. Hence, the EGR passageway 90 may also be called a combustion gas introducing passageway through which the combustion gas flows toward the catalyst converter 39.

Note that the EGR passageway 90 is also a passageway for connecting a portion which is disposed more downstream than the portion provided with the combustion heater 17, of the mainstream pipe 29 of the intake pipe 23, and a portion which is disposed more upstream than the portion provided with the catalyst converter 39, of the exhaust pipe 42, both in bypass to the engine cylinders.

Combustion Heater 17

The combustion heater 17 is a combustion device attached to the engine I as a separate device from the engine body 3, and it performs the combustion independently without being influenced at all by the combustion within the unillustrated cylinders of the engine body 3, and emits the combustion gas.

Further, the combustion heater 17 operates when the engine I is not only in the stop state but also in a predetermined operation state, and the CPU controls the operation of the combustion heater 17.

The "time when the engine I is in the predetermined operation state" implies conditions in which the car room needs warming and a temperature of the engine cooling water is low, a temperature of the catalyst is low, a reproducing process request condition of the lean NOx catalyst is established (when requested to execute the reproducing process of the lean NOx catalyst), etc. When the engine I is under at least one of these conditions, irrespective of whether or not the engine I operates, this implies a "time when the combustion heater 17 is required to operate" and, in other words, a "time when an operation executing condition of the combustion heater 17 is established." The time when the reproducing process request condition of the lean NOx catalyst is established (when requested to execute the reproducing process of the lean NOx catalyst) may refers to when requiring a NOx reduction of the lean NOx catalyst, when requiring recoveries from S-poisoning of the lean NOx catalyst and from SOF-poisoning thereof, and when requiring elimination of particulate matters from the lean NOx catalyst.

It is the CPU that makes a judgement of "the time when the combustion heater 17 is required to operate".

The CPU judges that it is "when the combustion heater 17 is required to operate", based on a variety of electric signals detected in every operation state of the engine by a variety of unillustrated sensors provided in the engine I and, with these detected values being converted and transmitted to the ECU 46.

The CPU, when judging that it is "the time when the combustion heater 17 is required to operate", operates the combustion heater 17, and the high-heat combustion gas is emitted therefrom. This combustion gas is supplied as a heat source for warming up the engine as well as for warming the car room.

Furthermore, the combustion heater 17 is originally a device for raising temperatures of engine related elements such as the engine cooling water in order to warm the car room and the engine as well. According to the present invention, however, the combustion heater 17 also functions as a device for purifying the exhaust gas by activation of the lean NOx catalyst contained in the catalyst converter 39 and for attempting the reproducing process thereof. This will be explained in sequence later on.

Outline of Structure of Combustion Heater 17

Figure 2:
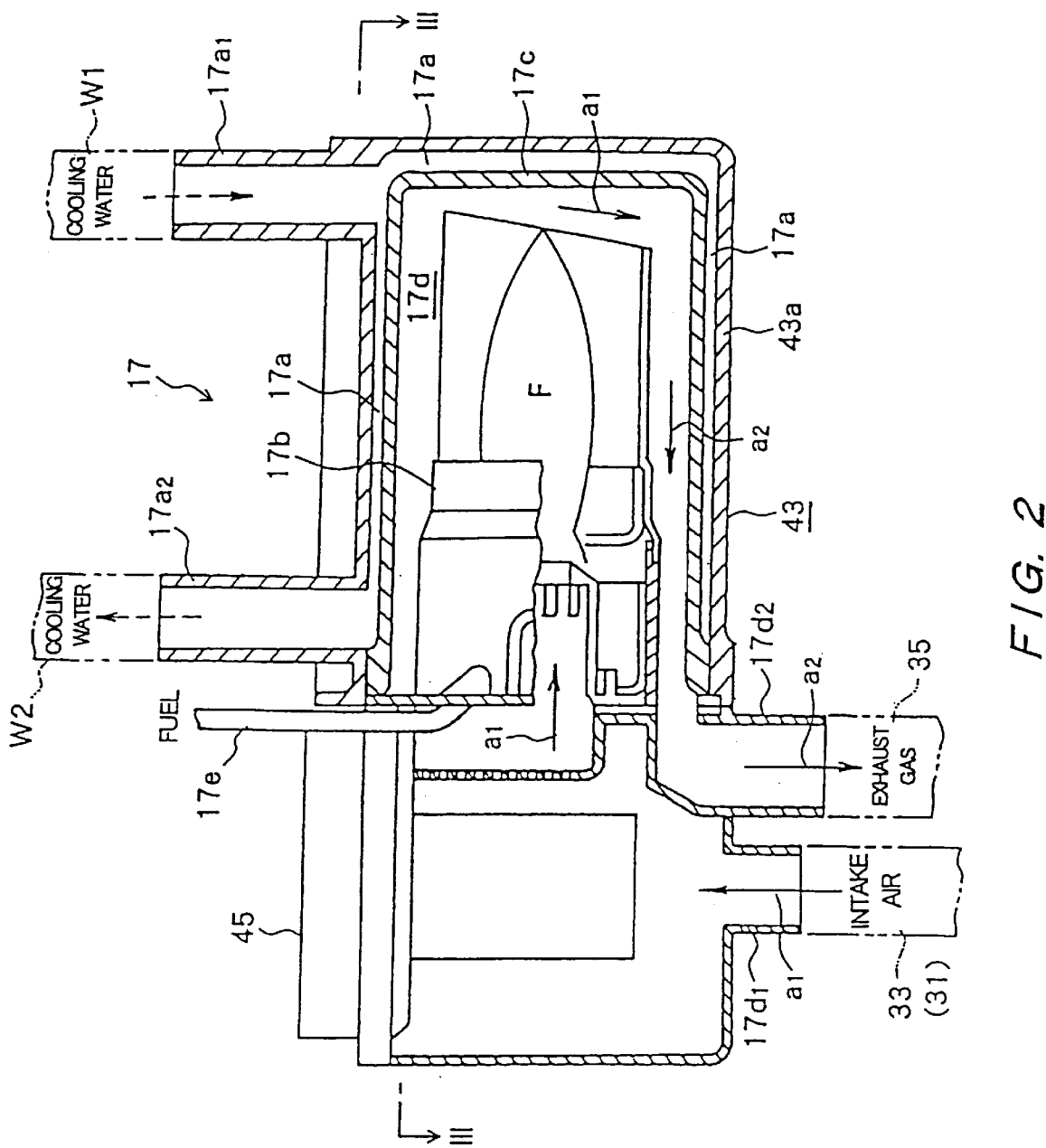
FIG. 2 is a sectional view schematically showing a combustion heater.

Next, a structure of the combustion heater 17 will be outlined referring to FIG. 2.

The combustion heater 17 is connected to the water jacket containing the engine cooling water. Therefore, the combustion heater 17 includes therein a cooling water passageway 17a through which the engine cooling water flows. This cooling water passageway 17a is warmed by the combustion gas flowing through a combustion chamber 17d serving as a heat source. The combustion chamber 17d is, with a combustion cylinder 17b being disposed therein, formed by covering this combustion cylinder 17b with a cylindrical partition wall 17c.

Combustion Chamber Body 43

The combustion chamber 17d is defined inside the partition wall 17c by covering the combustion cylinder 17b with the partition wall 17c. This partition wall 17c is also covered with a case body 43a, and the cooling water passageway 17a is formed between an internal surface of the case body 43a and an external surface of the partition wall 17c. Thus, the case body 43a and the structure including the cooling water passageway 17a, etc. embraced by this case body 43a, constitute a combustion chamber body designated by the numeral 43.

Air Flow Passageways of Combustion Heater 17

Further, the air supply passageway 33 and the combustion gas discharge passageway 35 belong to the branch pipe 31 for heater which is a tributary pipe of the mainstream pipe 29 belonging to the intake pipe 23. These passageways 33, 35 are applied to only the combustion heater 17 and function as air flow passageways for supplying the air for combustion to the combustion chamber body 43 and discharging the combustion gas therefrom Based on a recognition of this function, these passageways 33, 35 may be regarded, together with the combustion chamber body 43, as constituting elements of the combustion heater 17.

Combustion Chamber 17d

The combustion chamber 17d functions as an air flow passageway within the combustion heater 17 and therefore has an air supply port 17d1 and an exhaust gas discharge port 17d2 through which the air flows in and out. The air supply port 17d1 and the exhaust gas discharge port 17d2 are respectively connected to the air supply passageway 33 and the combustion gas discharge passageway 35.

Then, as already described above, the inlet air, after diverging from the mainstream pipe 29 and flowing via the branch pipe 31 for heater, as indicated by arrowhead solid lines in FIG. 2, flows via the air supply passageway 33 → the air supply port 17d1 → the combustion chamber 17d → the exhaust gas discharge port 17d2 → the combustion gas discharge passageway 35, and further flows, in the combustion-gas-contained state, back to the mainstream pipe 29. Subsequently, this inlet air, which has been warmed by the combustion heat of the combustion gas, is discharged from the combustion chamber body 43 via a route indicated by the above-mentioned arrowhead solid lines, during which the cooling water flowing as indicated by an arrowhead broken line in FIG. 2 through the cooling water passageway 17a is warmed by the thus warmed inlet air serving as a heat medium. Hence, the combustion chamber 17d may also be referred to as a heat-exchange passageway.

Combustion Cylinder 17b

The combustion cylinder 17b is structured to supply a combustion fuel through a fuel supply pipe 17e serving as a fuel supply passageway. The supplied combustion fuel is vaporized within the combustion chamber body 43 and turns out to be a vaporized fuel. Then, this vaporized fuel is ignited by an unillustrated ignition device, thus burning the vaporized fuel.

Cooling Water Passageway 17a

On the other hand, the cooling water passageway 17a has a cooling water introducing port 17a1 and a cooling waster discharge port 17a2. The cooling water introducing port 17a1 is, as can be understood from FIG. 1, connected via a water conduit W1 to a cooling water discharge port of the unillustrated water jacket of the engine body 3.

Further, the cooling water discharge port 17a2 is connected via a water conduit W2 to the car room heater 9. Then, the car room heater 9 is connected via a water conduit W3 to an unillustrated cooling water introducing port of the water jacket.

Accordingly, the cooling water of the water jacket arrives at the combustion heater 17 via the water conduit W1 and is warmed therein. Thereafter, the warmed water arrives at the car room heater 9 via the water conduit W2 from the combustion heater 17 and is heat exchanged as a heat medium of the car room heater 9, thereby blowing warm air into the car room. The cooling water, of which the temperature decreases due to the heat exchange, flows back to the water jacket via the water conduit W3. Thus, the cooling water is circulated between the engine body 3, the combustion heater 17 and the car room heater 9 via the water conduits W1–W3.

Note that the cooling water is circulated by an unillustrated water pump for the engine during the driving of the engine and also circulated, during non-driving of the engine, by an electrically-driven water pump W1a provided separately from the water pump for the engine. Hence, the car room heater 9 works even when the engine I is not operated.

Other Components of Combustion Heater 17

Note that the combustion chamber body 43 includes, in addition to the above-mentioned, an air blow fan 45 and an illustrated CPU dedicated to the combustion heater 17, and the combustion heater 17 is optimally operated by the CPU, whereby flames F are formed in the combustion chamber 17d.

Three-Way Valve 97

Next, the three-way valve 97 will be explained with reference to FIG. 3.

The three-way valve 97 has such a geometry that a first port 97a as one of three ports thereof is connected to the exhaust gas discharge port 17d2 of the combustion heater 17, a second port 97b, one of the two remaining ports, is connected to the combustion gas discharge passageway 35, and a third port 97c, the other of the remaining ports, is connected to the combustion gas introducing passageway 99. That is, the three-way valve 97 is positioned between the combustion heater 17, the combustion gas discharge passageway 35 and the combustion gas introducing passageway 99. A case body 97d of the three-way valve 97 encases a valve member 98 which moves in a longitudinal direction of the case body 97d by an operation of an unillustrated diaphragm.

Figure 3:
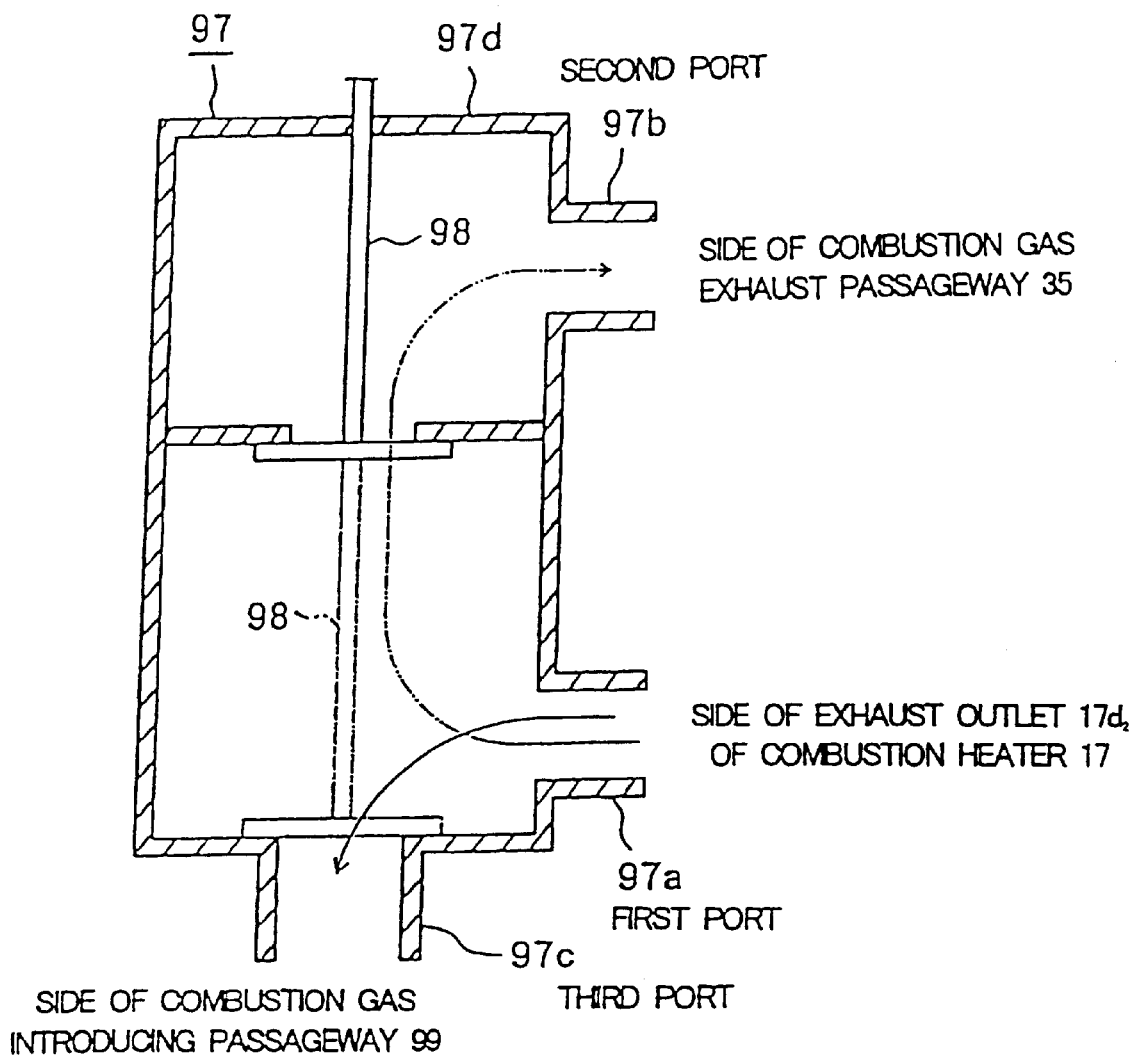
FIG. 3 is an explanatory view schematically showing a three-way valve.

The valve member 98, according to its moved positions within the case body 97d, makes the two ports among three ports, i.e., the first port 97a and the second port 97b communicate with each other, or the first port 97a and the third port 97d communicate with each other (see an arrowhead two-dotted chain line, and an arrowhead solid line in FIG. 3). Then, when the first port 97a communicates with the second port 97b, the third port 97c is closed. When the first port 97a communicates with the third port 97c, the second port 97b is closed.

More specifically, when required to operate the combustion heater 17 when the engine I in the operating state or stop state, the valve member 98 moves as indicated by the two-dotted chain line so that the first port 97a communicates with the second port 97b. In this case, when the combustion in the combustion heater 17 is effected, the combustion gas produced flows through, after flowing via the first and second ports 97a, 97b, the mainstream pipe 29 and the EGR passageway 90, and arrives at the catalyst converter 39 of the exhaust pipe 42. Hence, the catalyst converter 39 can be warmed up to an activation temperature before starting up the engine I and therefore functions effectively immediately after starting up the engine I.

Further, when the engine I is in the operating state or stop state and when required to operate the combustion heater 17, the valve member 98 moves as indicated by the solid line to make the first and third ports 97a, 97c communicated with each other. In this case, when the combustion in the combustion heater 17 is effected, the combustion gas produced thereupon flows via the first and third ports 97a, 97c, and thereafter arrives at the connecting point C5, disposed just anterior to the catalyst converter 39, of the exhaust pipe 42 via the combustion gas introducing passageway 99.

Hence, the temperature of the lean NOx catalyst contained in the catalyst converter 39 can be promptly raised up to the activation temperature even if not yet activated after starting up the engine I. Therefore, even when the output of the engine I is still in a light-load state, the lean NOx catalyst can function effectively at once.

Thus, the three-way valve 97 may be called a switching valve for switching over a direction of the flow of the combustion gas by introducing the combustion gas emitted from the combustion heater 17 into the intake mainstream pipe 29, the EGR passageway 90 and the combustion gas introducing passageway 99, or by cutting off the inflow to thereto. Further, the combustion gas is the exhaust gas from the combustion heater 17, and hence the three-way valve may also be called an exhaust switching valve.

Difference between Combustion Gas Introducing Passageway 99 and EGR passageway 90

The difference between the combustion gas introducing passageway 99 and the EGR passageway 90 is how much difficult it might be for the heat to escape during the period in which the combustion gas giving the heat to the catalyst flows through each of these passageways.

These two passageways 99, 90 are the same in terms of flowing the combustion gas toward the catalyst converter 39 without allowing it through the engine body 3. The combustion gas introducing passageway 99 is, however, a passageway for directly sending the combustion gas towards anterior to the catalyst converter 39, whereby the lean NOx catalyst contained in the catalyst converter 39 can be directly warmed.

By contrast, the EGR passageway 90 is structured to indirectly warm the lean NOx catalyst contained in the catalyst converter 39. To be more specific, the combustion gas must pass through the exhaust manifold 37 and the turbine 15b during a time span for which the combustion gas flows through the EGR passageway 90 and arrives at the catalyst converter 39, and therefore the heat held by the combustion gas is absorbed by the exhaust manifold 37 etc when passing therethrough. For this reason, there might be a case where the lean NOx catalyst is not sufficiently warmed by the combustion gas through the EGR passageway 90.

The EGR passageway 90 needs the intake throttle valve 70, which is required to be provided between the intake port C1 and the exhaust port C2, and can be used only when the engine I does not operate. By contrast, the combustion gas passageway 99 may not need the intake throttle valve 70 which may be, if provided, disposed downstream of the intake and exhaust ports C1 and C2, and can be used without being restricted at all in terms of time, whether before or after the driving to the engine I.

Further, in the case of having the three-way valve 97 and the combustion gas introducing passageway 99, either the EGR passageway 90 or the combustion gas introducing passageway 99 can be utilized, before the engine operates. In this case, a determination of which passageway is utilized, the EGR passageway 90 or the combustion gas introducing passageway 99, may be different depending on a degree of the temperature of the lean NOx catalyst contained in the catalyst converter 39. Namely, if the catalyst temperature is not so low, the catalyst temperature may be adjusted to gently reach the activation temperature by use of the EGR passageway 90. If the catalyst temperature is considerably low, it may be raised promptly up to the activation temperature by use of the combustion gas introducing passageway 99. The determination of which passageway is utilized for increasing the catalyst temperature before the engine operates, is made by the CPU based on the detected values outputted from the respective sensors provided in the engine I.

Reproducing Process Execution Routine of Lean NOx Catalyst by Use of Combustion Heater 17

Figure 4:
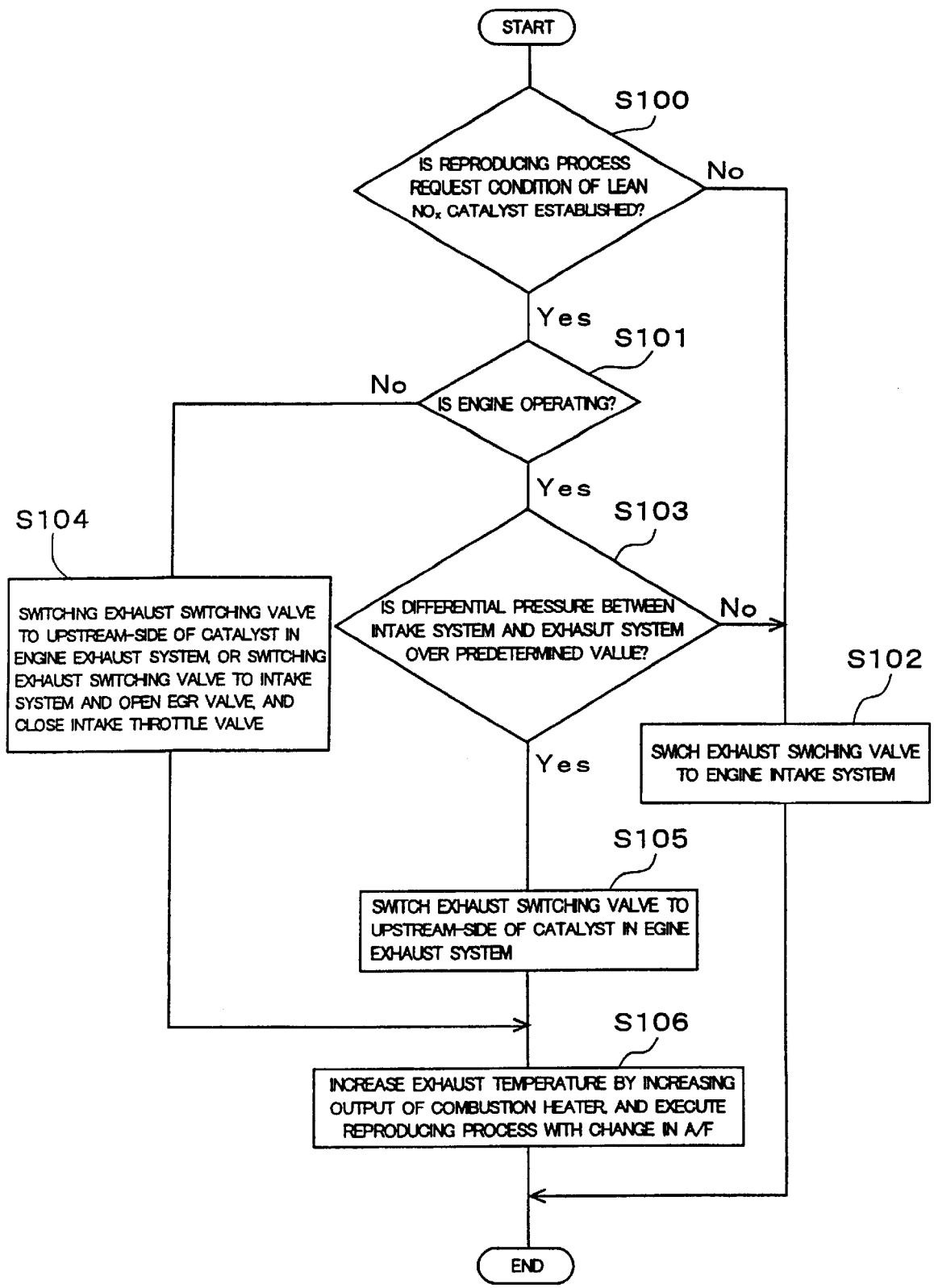
FIG. 4 is a flowchart showing a reproducing process execution routine of a lean NOx catalyst in the first embodiment.

Next, a program for actualizing a routine for executing the reproducing process of the lean NOx catalyst by use of the combustion heater 17, will be explained referring to a flowchart in FIG. 4.

Further, the programs for executing the routines including those other than the above routine are stored in a ROM of the ECU 46. Moreover, the processes in respective steps in the flowcharts are all executed by the CPU of the ECU 46.

To start with, the CPU judges in S100 whether or not the reproducing process request condition of the lean NOx catalyst is established. A method of judging whether or not the reproducing process request condition of the lean NOx catalyst is established, may be, for example, (1) depending on whether or not a predetermined operation time of the engine I elapses, (2) depending on whether or not the output of the outlet NOx sensor 39c provided at the rear of the catalyst converter 39 becomes above a predetermined value, and (3) depending on whether or not an integrated value of quantity of the fuel supplied to the engine I becomes above a predetermined value. The above-mentioned predetermined values serve as indexes for indicating, for example, that the reproducing process request condition of the lean NOx catalyst is established when the operation time, etc. of the engine I exceeds the predetermined time, etc., and may differ depending upon the types of the engine and of the car.

If judged to be affirmative in S100, the processing proceeds to S101. Whereas if judged to be negative, the processing proceeds to S102.

It is judged in S101 whether or not the engine is in its operation. If judged to be affirmative in S101, the processing proceeds to S103. Whereas if judged to be negative, the processing goes to S104.

In S103, whether or not a differential pressure between a pressure of the intake system and a pressure of the exhaust system is a predetermined value or more, is judged from the values detected by the intake air pressure sensor 29a and the exhaust gas pressure sensor 29b. Note that "the predetermined value" is a value with which the pressure of the intake system is higher than the pressure of the exhaust system when operating the combustion heater in the state where the above differential pressure is above the predetermined value, and hence the combustion gas from the combustion heater 17 is allowed to flow toward the exhaust system, i.e., a value with which a back flow does not occur.

The case where the back flow does not occur is considered to be a case where, for example, the turbo charger 15 is operating.

If judged to be affirmative in S103, the processing advances to S105. Whereas if judged to be negative, the processing goes to S102.

In S105, the three-way valve 97 serving as the exhaust switching valve is switched over to the upstream-side of the catalyst converter 39 of the engine exhaust system. In this case, the engine I is being operated, and therefore the EGR passageway 90 can not be utilized as the combustion gas introducing passageway. Hence, the three-way valve 97 is switched over to open the combustion gas introducing passageway 99.

In the next S106, the operation of the combustion heater 17 is controlled for the reproducing process of the lean NOx catalyst. To be more specific, both of a fuel supply quantity and a fuel/air supply quantity are increased so that the combustion gas holds high heat, and the output of the combustion heater 17 is set larger than before issuing the reproducing process request of the lean NOx catalyst. Further, an air-fuel ratio (A/F) of the combustion gas of the combustion heater 17 is changed, and then the reproducing process is carried out. Thereafter, this routine comes to an end.

There will be given a further discussion on S102 if negated in S100 and S103.

In S102, the three-way valve 97 serving as the exhaust switching valve is switched over to the side of the engine intake system. To describe it plainly, the combustion gas discharge passageway 35 is opened. Thereafter, this routine is finished.

The process in S104 is based on the premise that the reproducing process request condition of the lean NOx catalyst is established and the engine I does not operate. Hence, on the occasion of reproducing the lean NOx catalyst, either the combustion gas introducing passageway 99 or the EGR passageway 90 may be used for supplying the catalyst converter 39 with the combustion gas heat.

In other words, the combustion gas may be flowed to upstream of the catalyst in the engine exhaust system or flowed to the intake system by switching over the three-way valve 97 serving as the exhaust switching valve. When flowing the combustion gas to the intake system, the EGR valve 92 is opened, while the intake throttle valve 70 is closed. The reason why the EGR valve 92 is opened is to make the EGR passageway 90 allow the flow of the combustion gas therethrough, and the purpose of closing the intake throttle valve 70 is to prevent the back flow of the combustion gas through the mainstream pipe 29.

The processing proceeds to S106 after S104.

What has been discussed so far is the internal combustion engine, the engine I having the lean NOx catalyst of the first embodiment.

Note that the condition to be judged in S103, as to "whether or not the differential pressure between the pressure of the engine intake system and the pressure of the engine exhaust system is over the predetermined value", may be replaced with "whether or not the pressure of the engine intake system is over a predetermined value". This is because the pressure of the engine exhaust system can be predicted to some extent solely from the pressure of the engine intake system. "The predetermined value" in this case is substantially the same as the former predetermined value described above. Namely, the predetermined value may imply such a value that the pressure of the engine intake system becomes the predetermined value or greater, then, when the combustion heater is operated in that state, the pressure of the engine intake system becomes higher than the pressure of the engine exhaust system, consequently the combustion gas from the combustion heater is allowed to flow toward the engine exhaust system, and the back flow does not occur.

Given next is an explanation of routes through which the air flows when the engine I is in its stop state and when in its operation state.

Route of Air Flow When Engine I is in Stop State

When the reproducing process request condition of the lean NOx catalyst is established, and the output of the combustion heater 17 rises, the air sucked by an air blow fan 45 and entering the intake device 5 from the air cleaner 13, arrives at the catalyst converter 39 along the following routes.

(1) the air entering the upstream-side connecting pipe 25 of the intake pipe 23 from the air cleaner 13, diverges at the connecting point C1 of the mainstream pipe 29 via the compressor 15a of the turbo charger 15 and the inter cooler 19, and flows into the air supply passageway 33.

(2) The air entering the air supply passageway 33 is supplied into the combustion chamber body 43 of the combustion heater 17.

(3) The air entering the combustion chamber body 43 is used as the air for burning the combustion fuel supplied via the fuel supply pipe 17e in the combustion chamber 17d of the combustion chamber body 43, and, after the combustion, turns out to be the combustion gas, and this combustion gas flows out to the combustion gas discharge passageway 35. At that time, if the valve member 98 of the three-way valve 97 is set so that the flow of the combustion gas from the combustion heater 17 is directed toward the combustion gas introducing passageway 99, the combustion gas flows toward the catalyst converter 39 via the combustion gas introducing passageway 99. As a result, the combustion gas warms the lean NOx catalyst of the catalyst converter 39.

(4) If the valve member 98 of the three-way valve 97 is set so that the combustion gas from the combustion heater 17 flows through the combustion gas discharge passageway 35 toward the connecting point C2, the combustion gas flowing out of the combustion gas discharge passageway 35 thereafter enters the mainstream pipe 29 from the connecting point C2 of the mainstream pipe 29. At that time, the intake throttle valve 70 remains closed, and consequently the combustion gas flows toward the unillustrated intake port on the side of the engine body 3.

In the case of the route (4), the engine I remains stopped even when the combustion gas flows toward the intake port, and therefore the intake port and/or the exhaust port are closed. Hence, the combustion gas does not enter the cylinders of the engine body 3 or, even if entered, does not flow outside thereof. As a result, the combustion gas enters the EGR passageway 90 for connecting the intake manifold 21 to the exhaust manifold 37. At that time, the EGR valve 92 is opened, so that the combustion gas flows to the exhaust manifold 37 via the EGR valve 92. Then, the combustion gas arrives at the catalyst converter 39 via the turbine 15b of the exhaust pipe 42.

Route of Air flow When Engine I is in Operation State

Next, when the engine I is in the operation state, the reproducing process request condition of the lean NOx catalyst is established, and the combustion heater 17 operates, thereupon, the air entering the intake device 5 from the air cleaner 13 arrives at the exhaust device 7 along the following routes.

(1) The air entering the upstream-side connecting pipe 25 of the intake pipe 23 from the air cleaner 13 flows towards the mainstream pipe 29 via the compressor 15a of the turbo charger 15 and the inter cooler 19. At that time, since the engine I works, the intake throttle valve 70 is opened, and a large proportion of the air flows toward the intake port of the engine body 3.

(2) Simultaneously, upon a suction by the air blow fan 45, the air diverges at the connecting point C1 to the air supply passageway 33, and the diverged air is used for the combustion in the combustion heater 17 and thereafter turns out the combustion gas holding the heat. Then, if the valve member 98 of the three-way valve 97 is set so that the combustion gas flows through the combustion gas discharge passageway 35 toward the connecting point C2, the combustion gas holding the heat, which flows out of the combustion gas discharge passageway 35, thereafter enters the mainstream pipe 29 from the connecting point C2 of the mainstream pipe 29 and is used for warming up the engine. The combustion gas entering the mainstream pipe 29, with the engine I being operated, enters the cylinders from the intake port thereof. Thereafter, the combustion gas flows to the catalyst converter 39 via the exhaust port and further via the exhaust manifold 37 and the turbine 15b.

(3) If the ECU judges that the priority should be given to the activation or the reproducing process of the lean NOx catalyst of the catalyst converter 39 during the operation of the engine I, the valve member 98 is to be set so that the combustion gas flows toward anterior to the catalyst converter 39 while being guided along the combustion gas introducing passageway 99. In that case, the combustion gas arrives at the connecting point C5, disposed anterior to the catalyst converter 39, of the exhaust pipe 42 via the combustion gas introducing passageway 99.

The condition for setting the valve member 98 so that the combustion gas flows through the combustion gas discharge passageway 35 toward the connecting point C2, may be a case where the ECU judges that the priority should be given to the warm-up of the engine body 3 ahead of the activation of the lean NOx catalyst. Accordingly, contrastingly when the ECU judges that the priority should be given to the activation or the reproducing process of the lean NOx catalyst of the catalyst converter 39 during the operation of the engine I, the valve member 98 is set so that the combustion gas flows toward anterior to the catalyst converter 39 while being guided along the combustion gas introducing passageway 99.

The compressor 15a operates synchronizing with the start-up of the engine I, and hence, upon the operation of the compressor 15a, there increases an intake pressure at a point, disposed more downstream than the compressor 15a, of the downstream-side connecting pipe 27. Then, as described above, the combustion heater 17 operates also during the operation of the engine I.

When the engine I operates, the EGR passageway 90 is, as a matter of course, not used as the combustion gas introducing passageway. This is because the EGR passageway 90 functions as the exhaust gas recirculation device by way of its original application.

In addition, the EGR 88 is used as the exhaust gas recirculation device to perform its original function, but is not used for warming up the catalyst, and only the combustion gas introducing passageway 99 may be utilized exclusively for warming up the catalyst.

Figure 5:
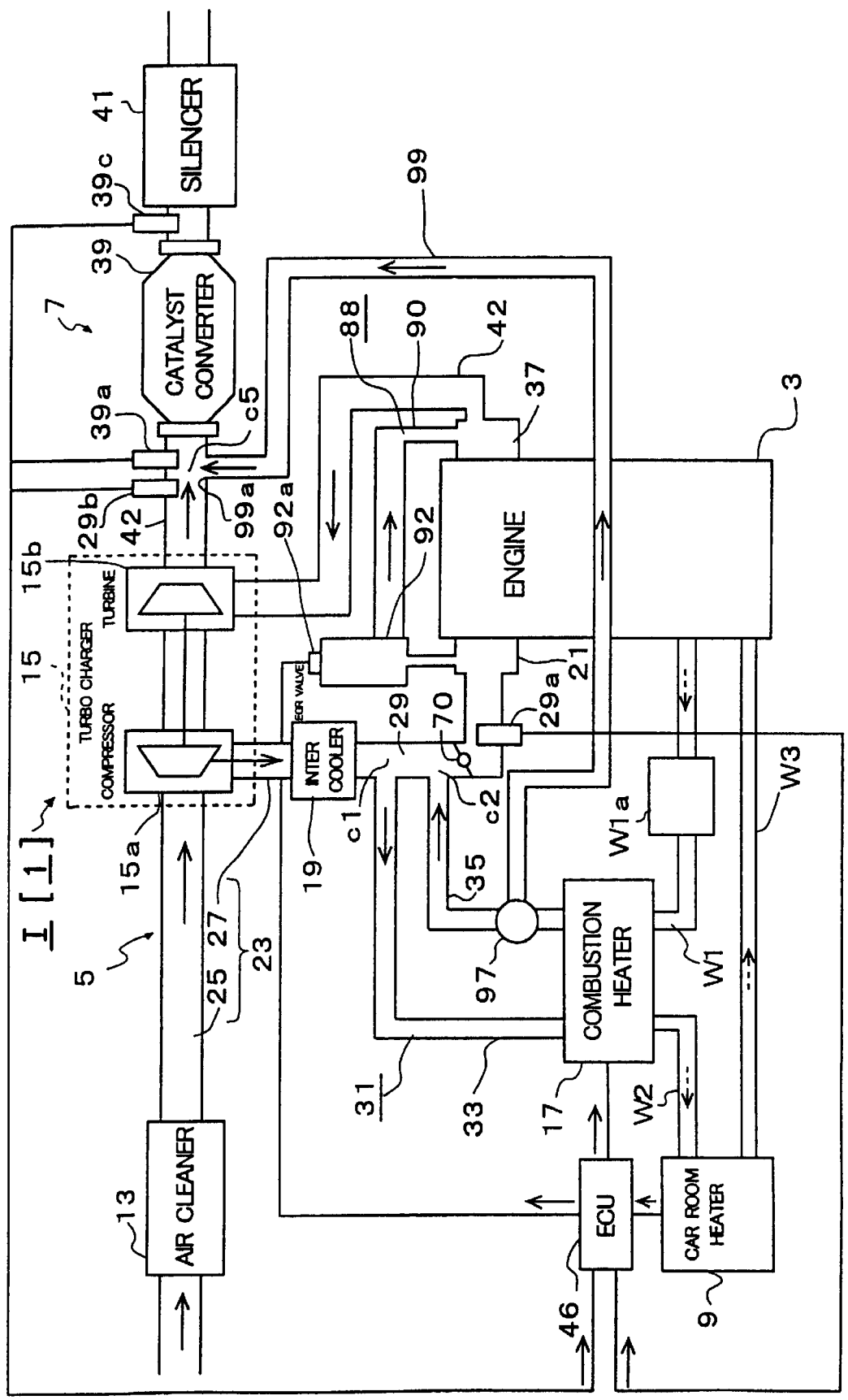
FIG. 5 is a view showing an example of application of the first embodiment of the internal combustion engine having the lean NOx catalyst according to the present invention.

In that case, as shown in FIG. 5, a connecting point of the combustion gas discharge passageway 35 to the intake pipe 23 is set so that the combustion gas emitted from the combustion heater 17 can be discharged more upstream than the portion provided with the intake throttle valve 70. With this arrangement, an ignition property of the combustion heater 17 can be stabilized.

Operational Effects of First Embodiment

Next, operational effects of the first embodiment will be explained.

(1) In the engine I, when requested for the reproducing process of the lean NOx catalyst, the combustion gas flows via the combustion gas introducing passageway 99 and the EGR passageway 90, and further flows to upstream of the catalyst converter 39 containing the lean NOx catalyst. Accordingly, at that time, if the output of the combustion gas heat is increased by setting the output of the combustion heater 17 larger than before making the reproducing process request of the lean NOx catalyst, the lean NOx catalyst is warmed by the high-heat combustion gas up to a temperature enough to be activated irrespective of the stop or non-stop of the engine I.

(2) Further, when the combustion state of the combustion heater 17 is adjusted so that the combustion gas contains proper amounts of hydrocarbon and carbon monoxide, it is feasible to ensure the hydrocarbon and the carbon monoxide serving as reduction agents enough to purify the exhaust gas, and to make the NOx reduction of the lean NOx catalyst and the recovery from the S-poisoning of the lean NOx catalyst without requiring the sub-injection which has hitherto been used in the prior art. Accordingly, if the combustion heater 17 has been kept operating from the time when the engine I was in the stop state, then after starting up the engine I, the exhaust gas can be, as a matter of course, effectively purified immediately after the start-up thereof, and the reduction of the lean NOx catalyst and the recovery from the S-poisoning of the lean NOx catalyst, can be also sufficiently expected.

(3) The combustion heater 17 is used for raising the temperature of the exhaust system in order to activate the catalyst, while an external load needs not be applied to the engine unlike the prior art. Hence, there must be a less production of unburned gas. It is therefore possible to restrain production of the particulate matters. Then, even if the SOF-poisoning of the lean NOx catalyst occurs, or if the particulate matters are adhered thereto, the soluble organic fractions (SOF) and the particulate matters can be burned by increasing the combustion gas heat. Hence, it is feasible to recover from the SOF-poisoning of the lean NOx catalyst and remove the particulate matters.

(4) The EGR passageway 90 is originally the existing structure in the engine I, and, therefore, if it is applied as the combustion gas introducing passageway when the engine stops, there is no necessity for newly providing the combustion gas introducing passageway. Thus, the whole apparatus does not become complicated in configuration, and besides the costs can be reduced.

(5) The combustion gas can be flowed directly to the point anterior to the catalyst converter 39, i.e., in close proximity to the lean NOx catalyst via the combustion gas introducing passageway 99 functioning as the bypass passageway. Therefore, the combustion gas heat can be utilized effectively without any waste for activating the lean NOx catalyst. Further, if the combustion gas introducing passageway 99 is structured as an adiabatic passageway, the combustion gas heat can be utilized solely for warming the catalyst by preventing the heat held by the combustion gas from escaping during the passing of the combustion gas through the combustion gas introducing passageway 99. Consequently, the lean NOx catalyst can be warmed further effectively. Accordingly, the exhaust gas can be purified much sooner corresponding thereto, and it is feasible to make the reduction of the lean NOx catalyst, the recovery from the S-poisoning or SOF-poisoning from the lean NOx catalyst, and to remove the particulate matters. That is, the lean NOx catalyst can be reproduced optimally by setting the temperature of the lean NOx catalyst so as to become suitable for the recovery from the above poisonings and the removable of the particulate matters.

(6) If the engine I stops at a stage of shortly after the engine has been started up, to be more specific, although the engine I stops, if the engine I has been operated with above a predetermined rotation speed or received a load over a predetermined value slightly earlier than that stoppage, then, the temperature of the lean NOx catalyst is still in a comparatively high region, and, therefore, a bed temperature of the lean NOx catalyst can be immediately raised up to the activation temperature or higher without increasing the output of the combustion heater 17.

(7) During even the stop of the engine I, the lean NOx catalyst of the catalyst converter 39 can be reproduced by utilizing the combustion gas having arrived at the catalyst converter 39 via either the EGR passageway 90 or the combustion gas introducing passageway 99.

(8) Even when the reproducing process of the lean NOx catalyst is unnecessary during the stop of the engine, the lean NOx catalyst can be preheated. Hence, with the start-up of the engine I, the lean NOx catalyst can be made to function effectively.

(9) If the combustion heater 17 is operated and when the differential between the pressure of the engine intake system and the pressure of the engine exhaust system is above the predetermined value, or when the pressure of the engine intake system is above the predetermined value, the combustion gas emitted from the combustion heater 17 can be flowed to the exhaust pipe 42 via the combustion gas introducing passageway 99 during even the operation of the engine I. In other words, if the pressure of the intake system is increased by operating the compressor 15a higher than the pressure of the exhaust system, the high-heat combustion gas can be supplied, in bypass, to the point anterior to the catalyst converter 39 provided in the exhaust pipe 42 via the combustion gas introducing passageway 99 even after starting up the engine. Besides, this supply is directly made under the high pressure. Hence, the combustion gas heat of the combustion heater 17 is smoothly transferred through the combustion gas introducing passageway 99 down to the catalyst converter 39, and consequently the lean NOx catalyst, if not yet activated, can be activated during the operation of the engine I. Further, since the interior of the combustion gas introducing passageway 99 is kept at the high pressure, it never occurs that the engine exhaust gas flows back via the combustion gas introducing passageway 99 toward the combustion heater 17.

(10) The intake throttle valve 70 is opened and the compressor 15a is operated when the engine is in its operation state, and, in this state, the rotation speed of the air blow fan 45 of the combustion heater 17 is increased, thereby facilitating the introduction of the combustion gas to the point anterior to the catalyst converter 39 via the combustion gas introducing passageway 99.

Second Embodiment

An engine II in a second embodiment will be described with reference to FIGS. 6 and 7.

Differences of the engine II in the second embodiment from the engine I in the first embodiment are only the following nine points. Hence, the same components of the engine II in the second embodiment as those of the engine I in the first embodiment, are shown with the same numerals with an omission of the repetitive explanations thereof.

(1) The branch pipe 31 for heater is connected not to the downstream-side connecting pipe 27 but to the upstream-side connecting pipe 25. Hence, the branch pipe 31 for heater in the upstream-side connecting pipe 25 is positioned more upstream than the compressor 15a.

(2) A tributary pipe 95 provided midways of the combustion gas discharge passageway 35 and extending downstream of the intake throttle valve 70.

(3) A geometry that the three-way valve 97 is provided at an intersection between the tributary pipe 95 and the passageway 35.

(4) A three-way valve 97' is provided midways of the tributary pipe 95, of which a structure is the same as the three-way valve 97.

(5) At least two or more of catalyst converters 39a, 39B (the two catalyst converters are provided in the second embodiment) are provided, which are arranged in parallel at the portion, positioned more downstream than the compressor 15b, in the longitudinal direction, of the exhaust pipe 42, wherein the flow of the exhaust gas diverges alternately.

(6) Another combustion gas introducing passageway 99' corresponding to the combustion gas introducing passageway described in the first embodiment, is provided because of the two catalyst converters existing, and forward end of the passageway 99' branches off in two ways. Further, a part of the exhaust pipe 42 is formed as a duplex passageway 42a in which the catalyst converters are disposed. The forked ends of the combustion gas introducing passageway 99' are disposed upstream of the catalyst converters in the duplex passage 42a, corresponding to the above configuration.

(7) Opening/closing valves 100, 100 for permitting and cutting off the flow of the exhaust gas toward the catalyst converters 39A, 39B, are respectively provided at the forked ends of the combustion gas introducing passageway 99'.

(8) An exhaust gas flow diverging device 102 for diverging the flow of the exhaust gas toward the catalyst converters 39A, 39B, is provided at an upstream-side boundary point 42b of the duple passageway 42a.

(9) Temperature sensors 104, 104, are provided respectively on the inlet sides of the catalyst converters 39A, 39B, of the duplex passageway 42a.

Note that an illustration of the silencer 41 is omitted. Further, the variety of sensors related to the catalyst converters 39A, 39B and the exhaust gas flow diverging device 102 are electrically connected to the ECU 46.

Figure 6:
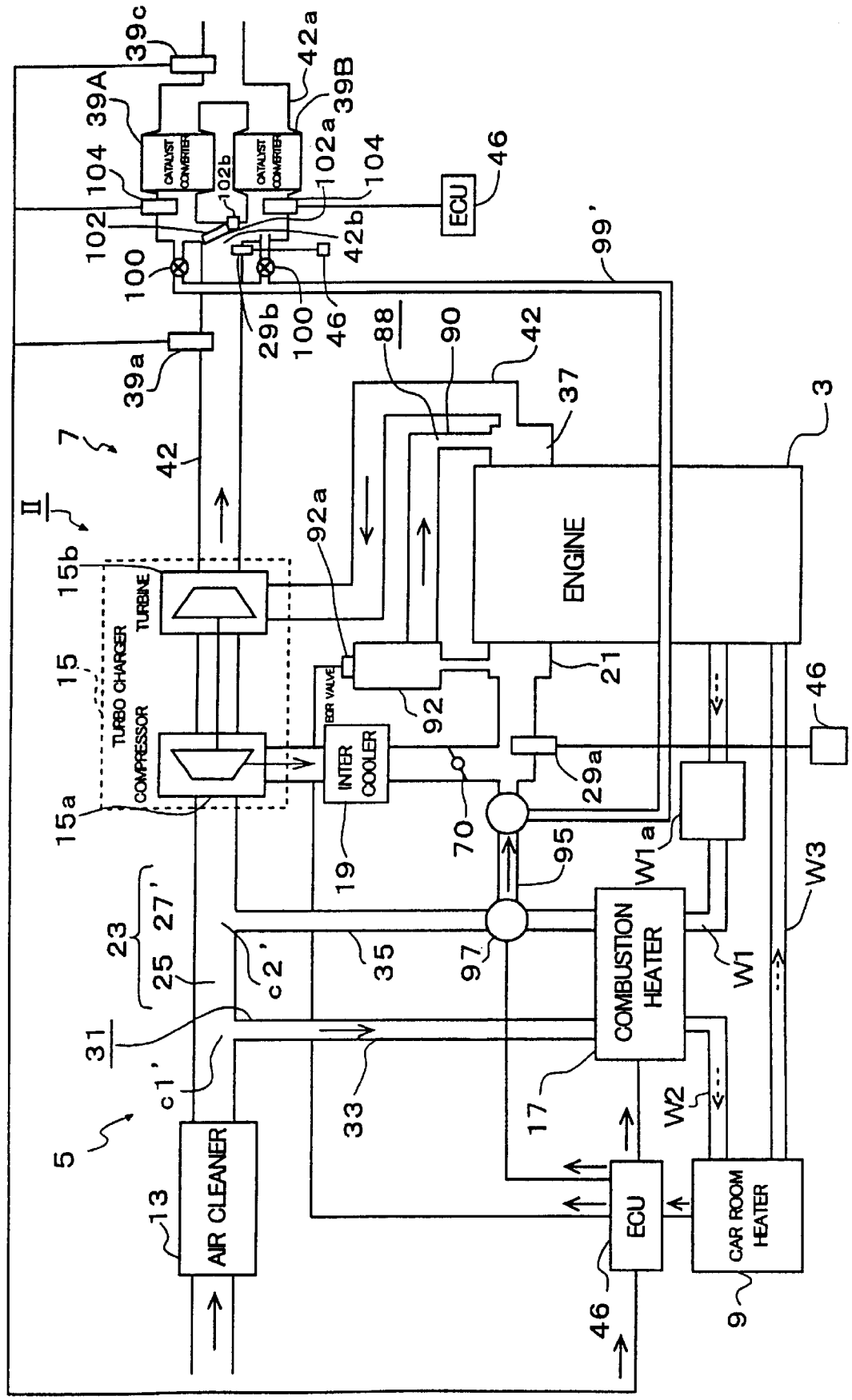
FIG. 6 is a diagram schematically illustrating a construction of the internal combustion engine having the lean NOx catalyst in a second embodiment of the present invention.
Figure 7:
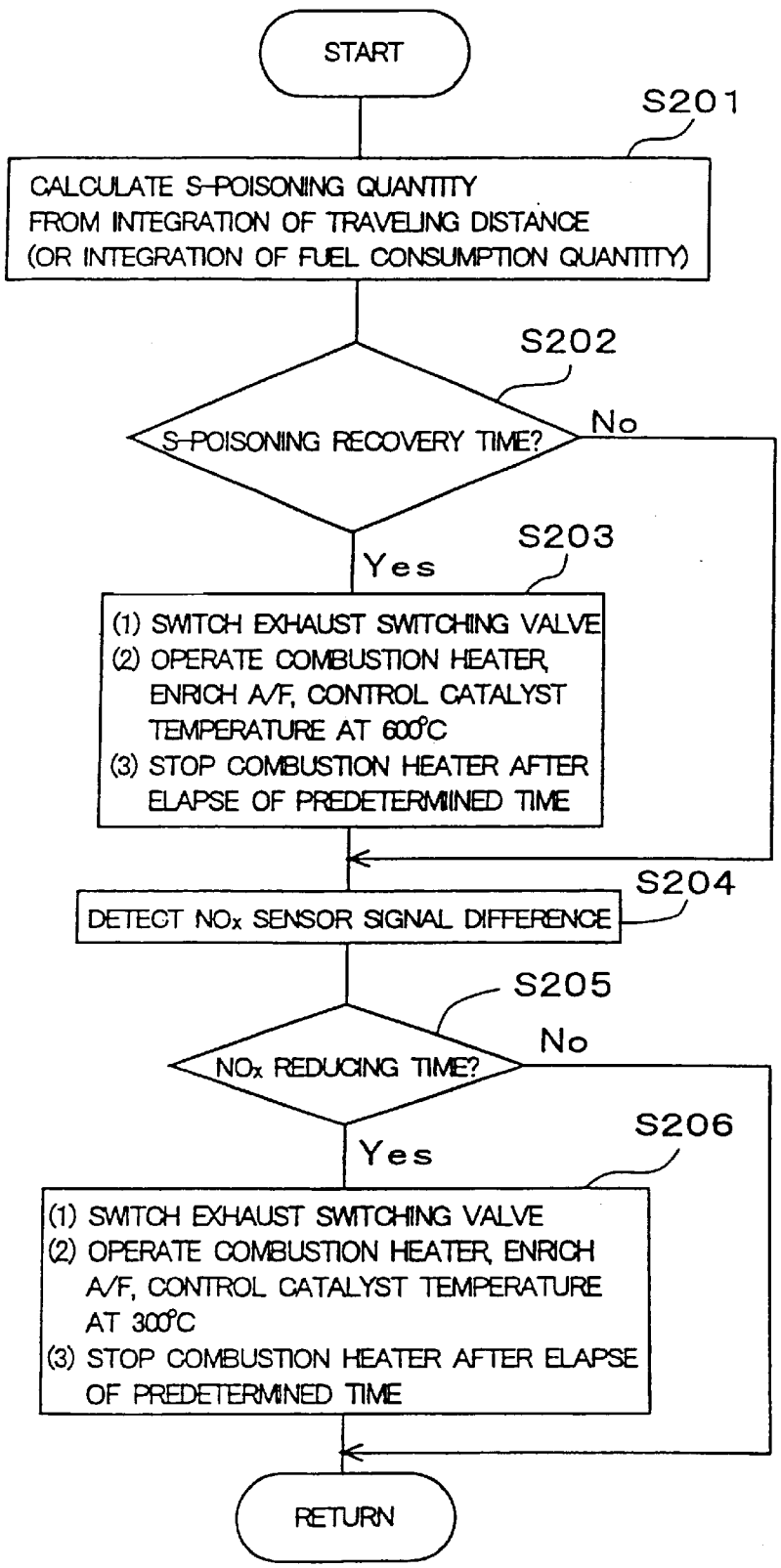
FIG. 7 is an explanatory diagram showing a recovering process from S-poisoning of the lean NOx catalyst, and a NOx reducing process execution routine.

As shown in FIG. 6, the branch pipe 31 for heater is connected to the upstream-side connecting pipe 25, whereby a U-shaped bypass passageway positioned upstream of the compressor 15a is formed of the branch pipe 31 for heater including the combustion heater 17, the air supply passageway 33 and the combustion gas discharge passageway 35. Then, the pipe corresponding to the downstream-side connecting pipe 27 explained in the first embodiment, is constructed of only an L-shaped downstream connecting pipe 27' for connecting the compressor 15a to the intake manifold 21, which corresponds to the mainstream pipe 29 described in the first embodiment. Further, connecting points, at which the air supply passageway 33 and the combustion gas discharge passageway 35 of the branch pipe 31 for heater are connected to the upstream-side connecting pipe 25, are designated by reference symbols C1' and C2', respectively.

Three-Way Valve 97'

Only one difference of the three-way valve 97' from the three-way valve 97 is just a position where each of these valves is fitted, and the configurations thereof are the same. Hence, an explanation of the configuration of the three-way valve 97' is omitted. Depending on the difference in the fitting position, however, points to which the first, second and third ports 97a, 97b, 97c are connected, are different from those in the three-way valve 97. This three-way valve 97' is, however, used for switching over the flow of the combustion gas of the combustion heater 17, which has flowed from the three-way valve 97, to the combustion gas passageway 99' or toward the engine body 3. Therefore, the discussion will be emphasized on a difference in the switching process, and, the explanation of each of the points to which the first to third ports 97a–97c are connected, is omitted.

In the case of the three-way valve 97' directing the flow of the combustion gas of the combustion heater 17 toward the combustion gas passageway 99', this implies the case where the lean NOx catalyst does not yet reach the activation temperature or when the reproducing process is needed, regardless of whether the engine I operates or not. In the case of the three-way valve 97' directing the combustion gas of the combustion heater 17 toward the engine body 3, this implies a case where the lean NOx catalyst does not yet reach the activation temperature or when the reproducing process is required, when the engine is started up at a low temperature or when the engine I is stopped. Then, in that case, the combustion gas is led to the catalyst converter 39A, 39B by utilizing the EGR passageway 90. It is, however, determined in the same way as described in the first embodiment whether to utilize the EGR passageway 90 or the combustion gas introducing passageway 99' in order to lead the combustion gas to the catalyst converters 39A, 39B before the operation of the engine, and this determination is made by the CPU based on the detected values of the variety of sensors provided in the engine II.

Exhaust Gas Flow Diverging Device 102

The exhaust gas flow diverging device 102 is a device for diverging the flow of the engine exhaust gas to the catalyst converter 39A or 39B. The exhaust gas flow diverging device 102 is constructed of a valve member 102a and a driving mechanism 102b thereof. The driving mechanism 102b is electrically connected to the ECU 46 (a state of the connection to the ECU 46 is not shown). Then, the exhaust gas flow diverging device 102 diverges the flow of the engine exhaust gas to either one of the catalyst converters 39A and 39B under the control of the CPU of the ECU 46. Further, the exhaust gas flow diverging device 102 is structured to prevent the combustion gas from flowing to the catalyst converter 39A or 39B which requires the reproducing process, wherein the valve member 102a hinders the flow of the exhaust gas to the catalyst converter requiring the reproducing process.

Recovering Process from S-Poisoning of Lean NOx Catalyst and NOx Reduction Process Executing Routine The reproducing process of the lean NOx catalyst has been described in the first embodiment. In the second embodiment, however, executions of a recovering process from the S-poisoning of the lean NOx catalyst and of a NOx reduction process, will be explained referring to a flowchart in FIG. 7.

When the processing shifts to this routine, a vehicle traveling distance or a fuel consumption quantity of the engine II is integrated in S201. Then, an S-poisoning quantity is calculated based on one of these integrated values. It is because the S-poisoning quantity increases in proportion to the traveling distance etc.

Hence, if the integrated value of the traveling distance etc comes to a certain specified value, it is judged, accordingly, that it is the timing when the recovery from the S-poisoning should be done, and the recovery from the S-poisoning is implemented. This judgement is made in S202.

The integrated values of the traveling distance, etc. are temporarily stored in a RAM (Random Access Memory) of the ECU 46. Then, the integrated values are called out to the CPU of the ECU as the necessity arises. Note that the S-poisoning quantity may be calculated based on not only the integrated value but also a temperature of the exhaust gas, or may also be calculated based on all these numerical values.

If judged to be affirmative in S202, the processing proceeds to S203. Whereas if judged negative, the processing proceeds to S204.

In S203, the combustion heater 17 is operated, and the combustion gas flows to the combustion gas introducing passageway 99' by operating the three-way valves 97, 97' serving as the exhaust gas switching valves. At that time, as in the case of the lean NOx catalyst being in the reduction atmospheric air, namely, as in the case of the lean NOx catalyst being in the atmospheric air containing much hydrocarbon and carbon monoxide serving as the reducing agents thereof, the output of the combustion heater 17 is controlled so that the air-fuel ratio (A/F) of the combustion gas from the combustion heater 17 becomes rich and besides a catalyst temperature is 600° C. or higher. The temperature of 600° C. is a temperature proper for executing the recovery from the S-poisoning of the lean NOx catalyst. The temperature sensor 104 detects a catalyst temperature when it becomes equal to or above 600° C. by controlling the output of the combustion heater 17.

Thereafter, the combustion heater 17 is stopped after the lapse of a predetermined time. "The predetermined time" connoted herein is a time long enough to make the recovery from the S-poisoning of the lean NOx catalyst.

In S204, the difference between the value detected by the inlet NOx sensor 39a and the value detected by the output NOx sensor 39c, is detected as a signal difference.

It is judged in S205 based on the detected result obtained in S204 whether or not it is the time for reducing the lean NOx catalyst contained in the catalyst converter 39. This judgement may be made based on presumption from an unillustrated known NOx discharge quantity map. If judged to be affirmative in S205, the processing advances to the next S206. Whereas if judged negative, this routine comes to an end. This routine is repeated as the necessity may arise.

In S206, the combustion heater 17 is operated, and the combustion gas is flowed to the combustion gas introducing passageway 99' by operating the three-way valves 97, 97' serving as the exhaust gas switching valves. At that time, the output of the combustion heater 17 is controlled so that the air-fuel ratio in the combustion heater 17 becomes rich and besides a temperature of the lean NOx catalyst becomes equal to or about 300° C. The temperature of 300° C. is a temperature proper for executing the NOx reduction. The temperature sensor 104 detects a temperature of the lean NOx catalyst also when the temperature of the lean NOx catalyst becomes equal to or above 300° C. by controlling the output of the combustion heater 17.

Thereafter, the combustion heater 17 is stopped after the lapse of a predetermined time, and this routine is repeated according to the necessity. Note that "the predetermined time" connoted herein is a time long enough to execute the reducing process of the lean NOx catalyst.

Operational Effects of Second Embodiment

Operational effects in the second embodiment will be explained.

In the second embodiment, the arrangement is not that the exhaust gas is flowed simultaneously to both of the two lean NOx catalysts but that the exhaust gas is flowed to only one catalyst converter 39A (or 39B) by operating the exhaust gas flow diverging device 102, but is not flowed to the other catalyst converter 39B (or 39A) until there comes to a state of making the process request as in the case of one catalyst converter 39A (or 39B) requiring the recovery from the S-poisoning and the NOx reduction (which will hereinafter be simply termed "the process request"). The output control of the combustion heater is changed depending on the object to be processed as in S203 and S206.

Then, when one catalyst converter 39A (or 39B) becomes the state of making the process request, the exhaust gas flow diverging device 102 is operated reversely to the previous operation this time, thereby flowing the exhaust gas to only the other catalyst converter 39B (or 39A). Subsequently, at that time, in one catalyst converter 39A (or 39B), the combustion gas heat is transferred from the combustion gas introducing passageway 99' by opening/closing valve 100 related to the catalyst converter 39A (or 39B), and the process of one catalyst converter 39A (or 39B) is carried out. At that time, the opening/closing valve 100 related to the other catalyst converter 39B (or 39A) is kept closed.

Next, when the other catalyst converter 39B (or 39A) becomes the state of making the process request, the exhaust gas flow diverging device 102 is operated, thereby preventing the exhaust gas from flowing to the other catalyst converter 39B (or 39A). Simultaneously, the exhaust gas is flowed to only one catalyst converter 39A (or 39B) which has already done the process, and the combustion gas heat is transferred to the other catalyst converter 39B (or 39A) by opening the opening/closing valve 100 related to the other catalyst converter 39B (or 39A), and the process of the other catalyst converter 39B (or 39A) is executed.

Thus, in the engine II, of the two catalyst converters 39A and 39B, the catalyst converter 39A (or 39B) having come to the state of making the process request is set non-operating, i.e., does not receive the inflow of the exhaust gas, while the other catalyst converter 39B (or 39A) purifies the exhaust gas, and hence the emission can be done with no interruption of the exhaust gas purifying process. It is therefore feasible to carry out the emission and purification of the exhaust gas at a high efficiency.

Further, in the engine II, when making the requests for the NOx reduction of the lean NOx catalyst and for the recovery from the S-poisoning thereof, the air-fuel ratio of the combustion gas is enriched as in the case of the lean NOx catalyst being in the reduction atmospheric air, and consequently the exhaust gas contains a large quantity of reduction gas components such as hydrocarbon and carbon monoxide in addition to the rise in the combustion gas heat. Hence, it is possible to perform the NOx reduction of the lean NOx catalyst and the recovery from the S-poisoning thereof.

Third Embodiment

Next, an engine III in a third embodiment will be described with reference to FIGS. 8 and 9.

Figure 8:
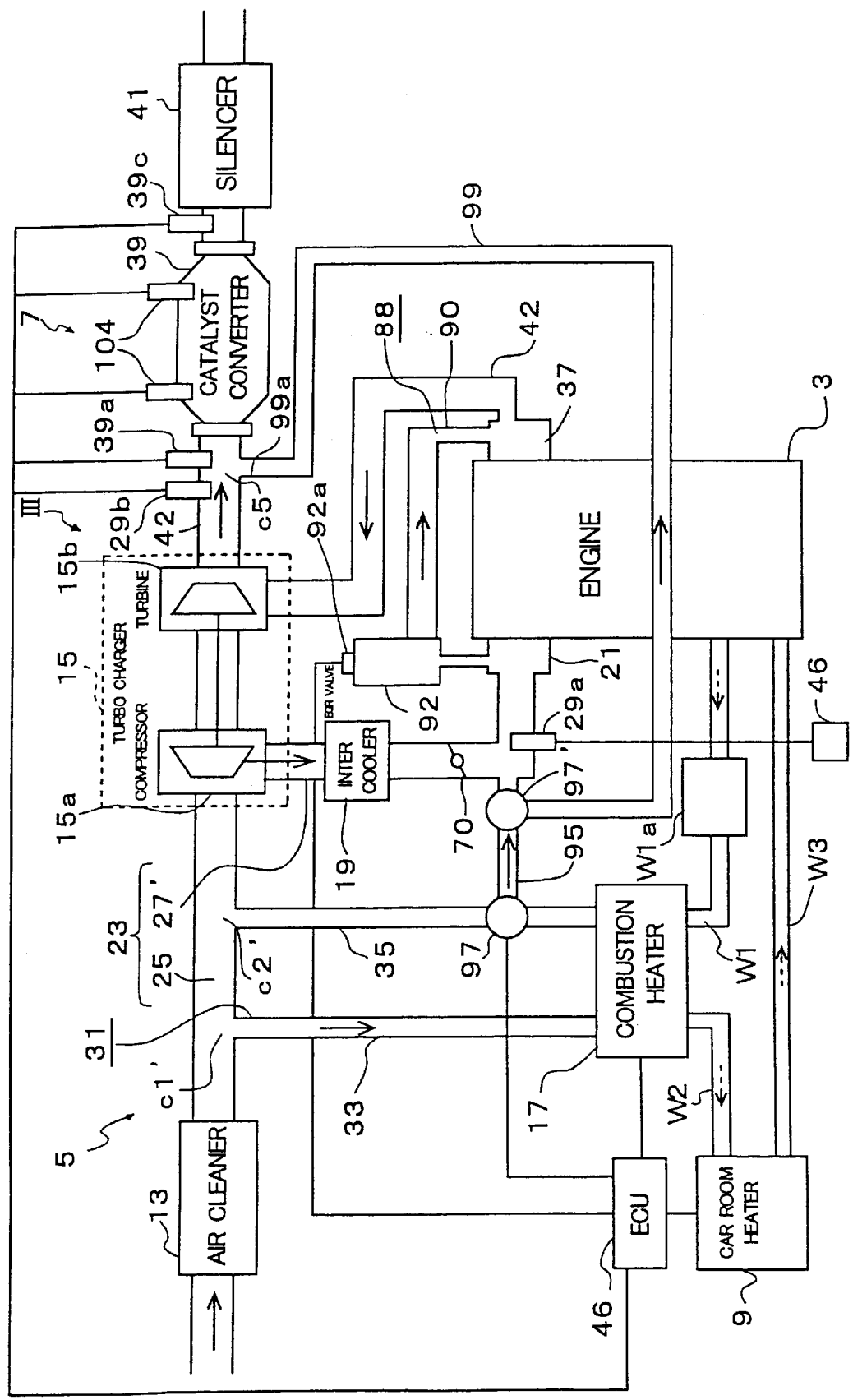
FIG. 8 is a diagram schematically illustrating a construction of the internal combustion engine having the lean NOx catalyst in a third embodiment of the present invention.
Figure 9:
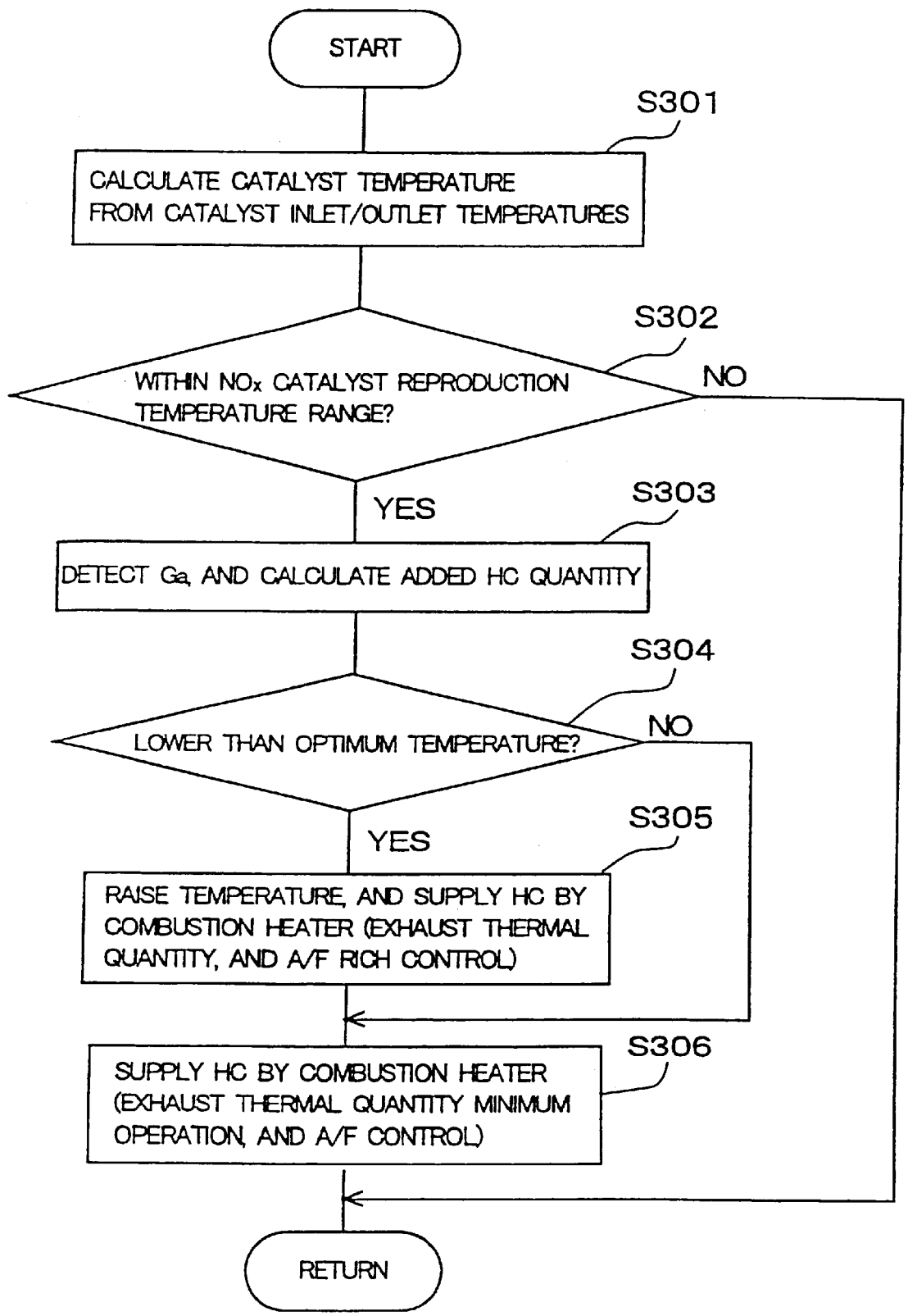
FIG. 9 is an explanatory flowchart showing an operation control execution routine of the combustion heater in the third embodiment.

While the two catalyst converters are provided in the engine II in the second embodiment discussed above, a single catalyst converter is provided in the engine III in the third embodiment, as shown in FIG. 8. Hence, the combustion gas introducing passageway does not have the duplex-passageway structure. Namely, the catalyst converter and the combustion gas introducing passageway exemplified in the third embodiment are of the same types as those in the first embodiment. Therefore, those components are marked with the same numerals 39 and 99 as those in the first embodiment. Further, the temperature sensors 104 are disposed at the front and rear portions of the catalyst converter 39. Other components are the same as those in the second embodiment and marked with the like numerals, of which the repetitive explanations are omitted.

According to also the engine III in the third embodiment, the supply of the hydrocarbon etc serving as the reducing agents can be made as required by the lean NOx catalyst by enriching the air-fuel ratio in the combustion heater 17. A program for actualizing an operation control execution routine of the combustion heater 17 in that case will be explained referring to a flowchart in FIG. 9.

Operation Control Execution Routine of Combustion Heater 17

When the processing moves to this routine, in S301, the temperature sensors 104 detect inlet and outlet temperatures of the catalyst converter 39, and a catalyst temperature is calculated from the difference between these temperatures. It is to be noted that the catalyst temperature implies not a temperature of the gas passing through the catalyst converter 39 but a temperature of the catalyst bed on which to place the lean NOx catalyst in the catalyst converter 39.

It is judged in S302 whether or not the temperature of the lean NOx catalyst is in a temperature range effective for reproducing the lean NOx catalyst. If judged to be affirmative in S302, the processing proceeds to S303. Whereas if judged negative, this routine is finished.

In S303, a proper air quantity detecting unit detects an air quantity Ga within the catalyst converter 39, and calculates a quantity of the hydrocarbon serving as the reducing agent, corresponding to that air quantity.

In the next S304, it is judged whether or not a temperature of the lean NOx catalyst 39 is lower than a temperature optimal for the catalyst 39 to exhibit its function. If judged to be affirmative in S304, the processing advances to S305. Whereas if judged to be negative, the processing proceeds to S306.

S305 is the process on the premise that the temperature of the lean NOx catalyst is lower than the temperature optimal for the catalyst to exhibit its the function. Hence, the rich-control is carried out so that an exhaust heat quantity and the air-fuel ratio in the combustion heater 17 become rich, whereby the temperature of the lean NOx catalyst is set to above the temperature optimal for the catalyst to exhibit its function by increasing the temperature of the combustion gas. At the same time, the hydrocarbon HC is supplied.

S306 is a step on the premise that the temperature of the lean NOx catalyst is above the temperature optimal for the catalyst to exhibit its function. Hence, the combustion heater 17 is operated in such a state that the exhaust heat quantity thereof is minimized, or the air-fuel ratio is controlled, whereby the hydrocarbon is supplied without raising the temperature of the combustion gas, and the lean NOx catalyst falls within a reproduction temperature range. Then, this routine is thereafter repeated according to the necessity.

Operational Effects of Third Embodiment

In the third embodiment also, the lean NOx catalyst can be reproduced regardless of the operating or non-operating of the engine.

Fourth Embodiment

An engine IV in a fourth embodiment will be described referring to FIG. 10.

Figure 10:
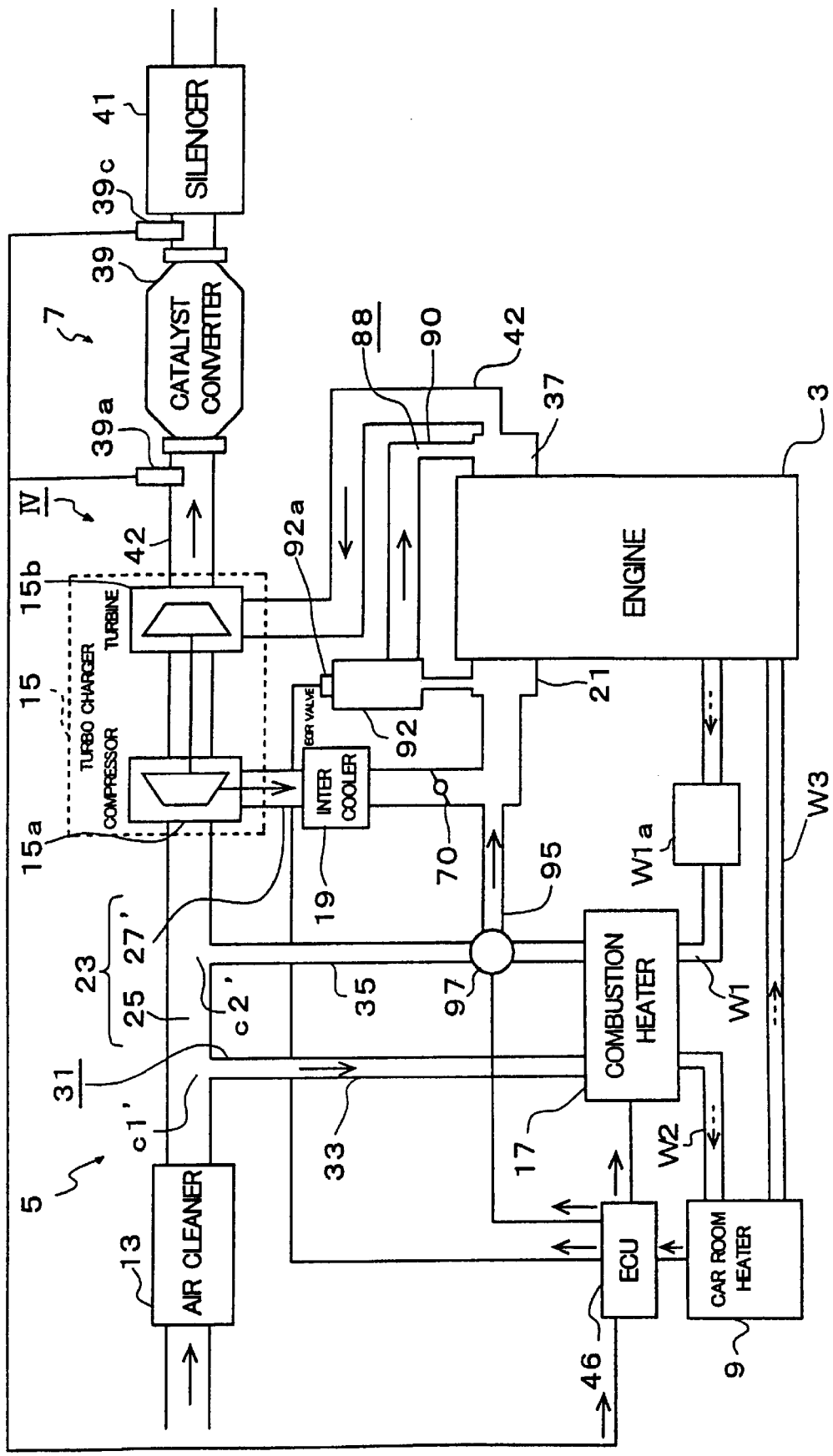
FIG. 10 is a diagram schematically illustrating a construction of the internal combustion engine having the lean NOx catalyst in a fourth embodiment of the present invention.

For performing reproducing the catalyst which is limited to only while the halt of the engine, the engine IV takes a structure as shown in FIG. 10. The difference of the structure of the engine IV shown in FIG. 10 from the engine III in the third embodiment shown in FIG. 8, is that the engine IV has neither the combustion gas introducing passageway 99, nor the intake and exhaust pressure sensors 29a, 29b, nor the three-way valve 97' provided in the tributary pipe 95.

Operational Effects of Fourth Embodiment

In the engine IV in the fourth embodiment, the lean NOx catalyst 39 can be reproducing by utilizing the EGR passageway 90 during the halt of the engine.

Fifth Embodiment

An engine V in a fifth embodiment will be explained referring to FIG. 11 for another case of performing reproducing the catalyst limited to only while the halt of the engine.

Figure 11:
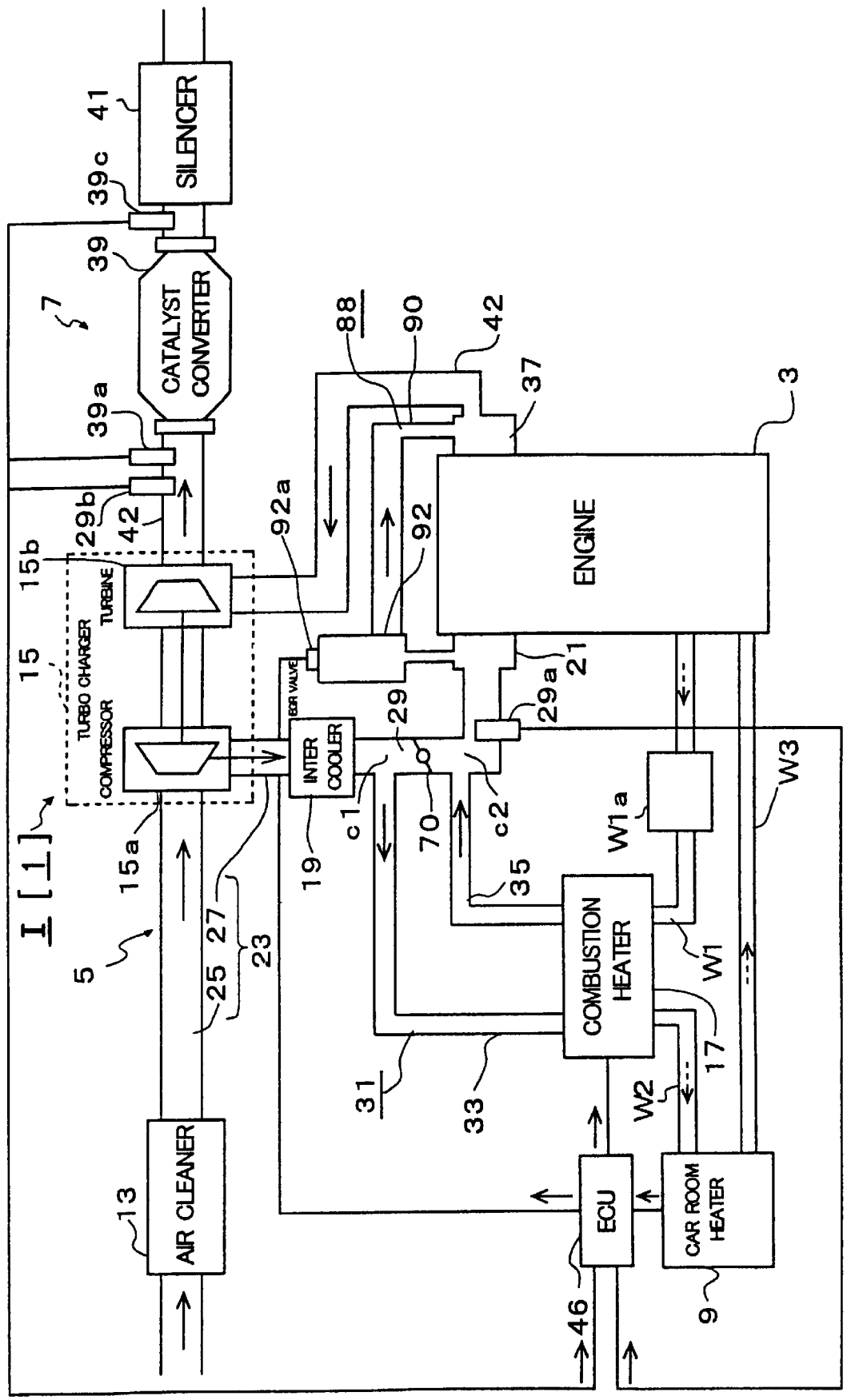
FIG. 11 is a diagram schematically illustrating a construction of the internal combustion engine having the lean NOx catalyst in a fifth embodiment of the present invention.

The engine V shown in FIG. 11 is different from the engine I in the first embodiment, in which the three-way valve 97 and the combustion gas introducing passageway 99 are removed from the engine I, and other components are the same.

Operational Effects of Fifth Embodiment

In the engine V in the fifth embodiment, the lean NOx catalyst 39 can be reproducing by utilizing the EGR passageway 90 during the halt of the engine.

Sixth Embodiment

Next, an engine VI in a sixth embodiment will be explained referring to FIGS. 12 to 15.

The difference of the engine VI in the sixth embodiment from the engine II in the second embodiment shown in FIG. 6, is that the engine VI has a single catalyst converter, the exhaust pipe 42 includes a catalyst bypass pipe bypassing the catalyst converter, and the portions related to these different portions are also different. Hence, the same components as those of the engine II in the second embodiment are marked with the same numerals as those shown in the second embodiment, of which the repetitive explanations are omitted.

Figure 12:
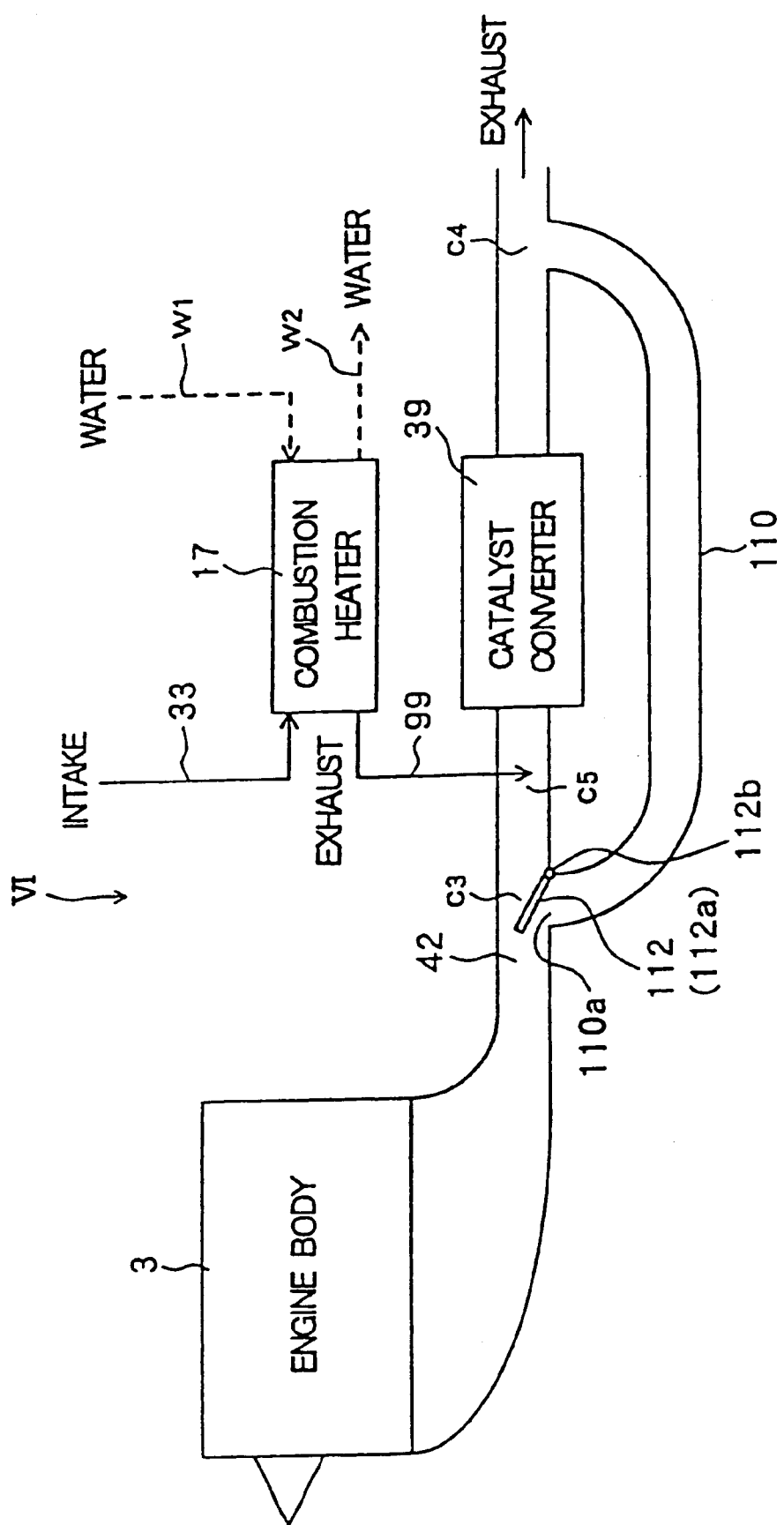
FIG. 12 is a diagram schematically illustrating a construction of the internal combustion engine having the lean NOx catalyst in a sixth embodiment of the present invention.

Note that FIG. 12 is a view schematically illustrating a geometry of the components in the sixth embodiment, however, the view is simplified as much as possible, except for the different portions from the second embodiment. Further, for making the discussion simple, the activation of the lean NOx catalyst involves the use of only the combustion gas introducing passageway 99, while the EGR passageway 90 is not used. However, before starting up the engine, as a matter of course, the lean NOx catalyst may be activated by use of the EGR.

Referring to FIG. 12, the engine VI in the sixth embodiment has a catalyst bypass pipe 110 extending from the exhaust pipe 42 and bypassing the catalyst converter 39, and an exhaust gas flow diverging device 112 for diverging the flow of the exhaust gas to the catalyst bypass pipe 110 and to the catalyst converter 39.

The catalyst bypass pipe 110 is an exhaust passageway which bypasses by connecting an upstream-side of the converter 39 to a downstream-side thereof.

The exhaust gas flow diverging device 112 is provided at a connecting point C3 positioned upstream, of two connecting points C3, C4 of the catalyst bypass pipe 110 to the exhaust pipe 42. Further, the exhaust gas flow diverging device 112 has an opening/closing valve 112a for enabling one opening 110a of the catalyst bypass pipe 110 to open and close, and a driving device 112b for driving the opening/closing valve 112a. Then, the CPU of the ECU 46 controls the drive of this exhaust gas flow diverging device 112.

Furthermore, the connecting point C3 to the exhaust pipe 42, provided with the exhaust gas flow diverging device 112, is positioned more upstream than a connecting point C5 of the combustion gas introducing passageway 99 to the exhaust pipe 42. This is intended to transfer the heat of the combustion gas flowing to the exhaust pipe 42 along the combustion gas introducing passageway 99, down to the catalyst converter 39 without any waste.

Next, a preferable example of adjusting the air-fuel ratio of the combustion gas introduced into the catalyst converter 39 of the engine VI having the construction described above, will be specifically explained separately at a stage (1) before starting up the engine, a stage (2) immediately after the start-up, and a stage (3) during the operation of the engine.

Poisoning matters deposited in the lean NOx catalyst are removed by an air-fuel ratio adjustment of the combustion gas which will be described later on, thereby reproducing the lean NOx catalyst at a high efficiency.

(1) Before starting up the engine, the air-fuel ratio is controlled for reproducing the lean NOx catalyst such as making the recovery from the S-poisoning of the lean NOx catalyst.

Figure 13:
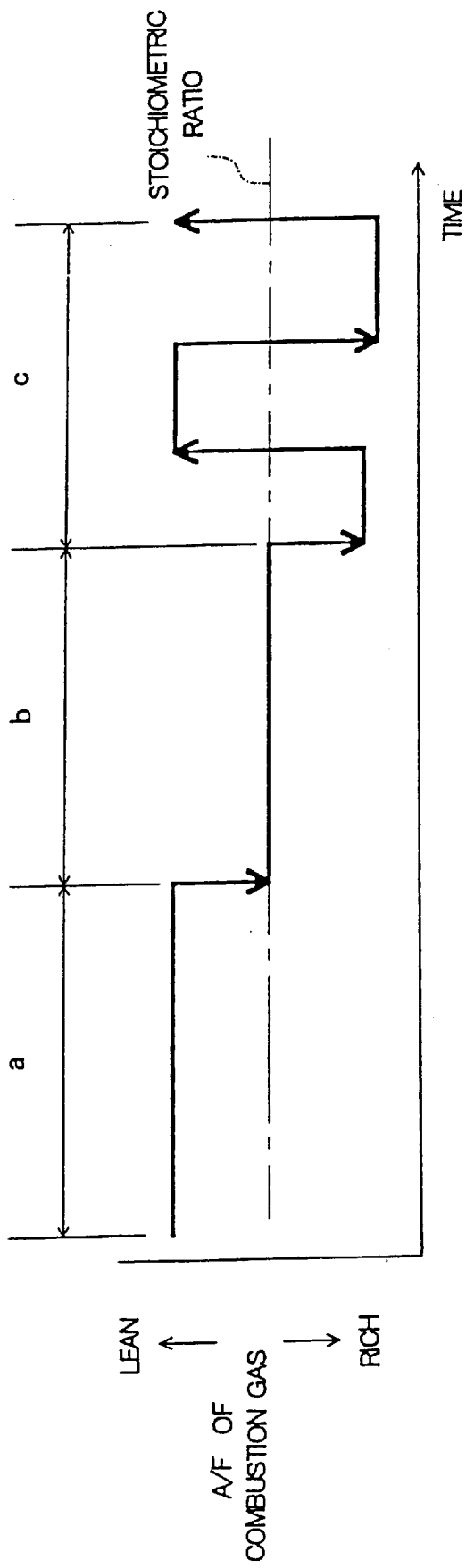
FIG. 13 is a combustion gas air-fuel ratio A/F versus time chart showing a recovery from the S-poisoning of the lean NOx catalyst before starting up the engine in the sixth embodiment.

The air-fuel ratio control will be explained referring to FIG. 13. FIG. 13 is an A/F versus time chart, wherein the vertical axis indicates the air-fuel ratio A/F of the combustion gas, and the horizontal axis indicates an elapse of time.

Referring to FIG. 13, the reference symbols a, b, c represent regions corresponding to explanatory items a–c which follow. Further, the one-dotted chain line in FIG. 13 implies a case where the air-fuel ratio A/F of the combustion gas is a stoichiometric ratio (a theoretical air-fuel ratio), and this is hereinafter called a stoichiometric line. Note that those symbols a, b, c and the stoichiometric line will have the same meanings in other A/F versus time charts shown in FIGS. 14 and 15.

a: Immediately after operating the combustion heater 17, the combustion control is performed so that the combustion gas does not contain the hydrocarbon and the carbon monoxide as the reducing agents to the greatest possible degree. In the region a, the air-fuel ratio A/F of the combustion gas is lean on the order of 20. Then, the combustion gas having such A/F enters the catalyst converter 39, whereby a temperature at the inlet of the catalyst converter 39 rises, and the lean NOx catalyst is activated. The combustion gas at that time, of which the air-fuel ratio is lean as described above, is the clean exhaust gas containing almost no hydrocarbon etc.

b: Assuming that when the temperature at the inlet of the catalyst converter 39 reaches the catalyst activation temperature (e.g., 200° C.) or higher, the air-fuel ratio A/F of the combustion gas in a stoichiometric ratio. At that time, the combustion gas contains 2–3% carbon monoxide and sufficient quantity of oxygen for burning it. Therefore, the carbon monoxide and the oxygen are supplied to the lean NOx catalyst, and the carbon monoxide is oxidated by the combustion, with the result that the temperature of the lean NOx catalyst further rises.

c: With the rise in the temperature of the lean NOx catalyst, the temperature increases (over 500° C.) enough to enable an S-desorption and the oxidation of SOF of the lean NOx catalyst to be done, in other words, to make the lean NOx catalyst reproducible. Thereupon, the air-fuel ratio A/F is repeatedly changed to be lean or rich, thereby attempting to reproduce the catalyst such as the recovery from the SOF-poisoning or the recovery from the S-poisoning.

(2) Controlling the air-fuel ratio is controlled for reproducing the Lean NOx catalyst such as performing the recovery from the S-poisoning of the lean NOx catalyst immediately after the start-up of the engine.

Figure 14:
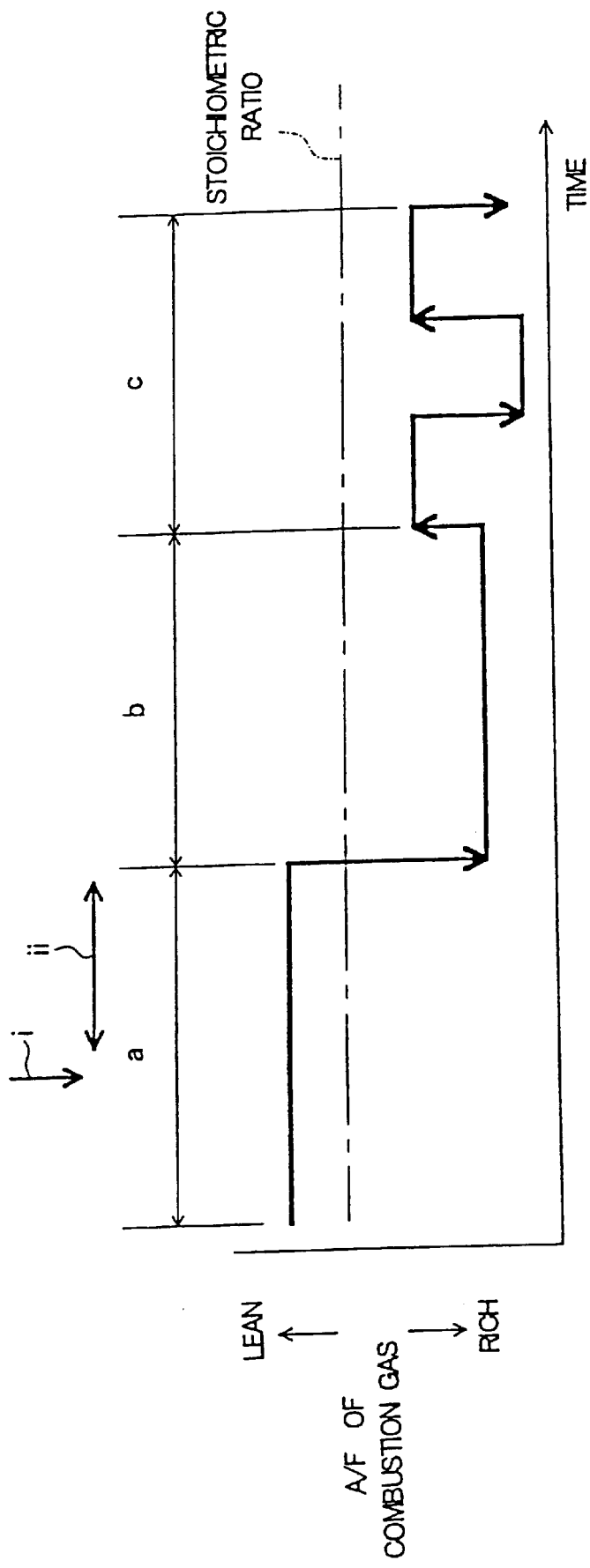
FIG. 14 is a combustion gas air-fuel ratio A/F versus time chart showing the recovery from the S-poisoning of the lean NOx catalyst immediately after starting up the engine in the sixth embodiment.

FIG. 14 is an A/F versus time chart. Referring to FIG. 14, the arrowhead i indicates a start timing of the engine VI. The graph in FIG. 14 has such an implication that the engine VI is still in the stop state in the left area from a position indicated by the arrowhead i in terms of the time axis, and the engine VI is in the operation state in the right area.

Similarly, an arrowhead region ii on the graph in FIG. 14 shows a period during which the exhaust gas of the engine VI flows through the catalyst bypass pipe 110. For allowing the exhaust gas to flow through the catalyst bypass pipe 110, the driving device 112b drives and opens the opening/closing valve 112a of the exhaust gas flow diverging device 112 provided in the opening 110a of the catalyst bypass pipe 110. The description about the arrowhead region ii is also the same in the A/F versus time chart in FIG. 15.

a: Before starting the engine, i.e., in the left area from the arrowhead i on the graph, the combustion gas is introduced into the catalyst converter 39 in order to warm up the catalyst. Similarly, in the right area from the arrowhead i, viz., after, more precisely, immediately after starting up the engine, the temperature of the exhaust gas might be lower than the temperature of the combustion gas. Hence, if the catalyst has not yet come to the sufficiently-warmed state nor reaches the activation temperature, the opening/closing valve 112a of the exhaust gas flow diverging device 112 is opened in order to flow the exhaust gas having the lower temperature than the combustion gas to the catalyst bypass pipe 110 without permitting the same exhaust gas to flow to the catalyst converter 39.

Until the lean NOx catalyst is warmed by the combustion gas, the combustion control is performed so that the combustion gas does not contain the hydrocarbon and the carbon monoxide as the reducing agents to the greatest possible degree. In the region a, the air-fuel ratio A/F of the combustion gas is lean on the order of 20. The combustion gas having such A/F enters the catalyst converter 39, whereby the temperature at the inlet of the catalyst converter 39 rises, and the lean NOx catalyst is activated.

b: When the temperature at the inlet of the catalyst converter 39 rises and the lean NOx catalyst reaches the activation temperature (e.g., 200° C.) or higher, the air-fuel ratio A/F of the combustion gas is set rich. At that time, the combustion gas contains a great quantity of carbon monoxide, then the carbon monoxide is oxidated by the catalyst, and the catalyst temperature further rises. At that time, the opening 110a of the catalyst bypass pipe 110 is closed by the opening/closing valve 112a of the exhaust gas flow diverging device 112. Then, the air-fuel ratio of the air-fuel mixture composed of the engine exhaust gas and the combustion gas is controlled between the lean A/F and the stoichiometric ratio.

c: With the rise in the temperature of the lean NOx catalyst, the temperature increases (over 500° C.) enough to enable the S-desorption and the oxidation of SOF of the lean NOx catalyst to be done, in other words, to make the lean NOx catalyst reproducible. Thereupon, the air-fuel ratio A/F is so controlled as to fluctuate in the rich region. At that time, the air-fuel ratio of the air-fuel mixture of the engine exhaust gas and the combustion gas repeatedly becomes lean and rich.

(3) Controlling the air-fuel ratio is controlled for reproducing the Lean NOx catalyst such as performing the recovery from the S-poisoning of the lean NOx catalyst during the operation of the engine.

Figure 15:
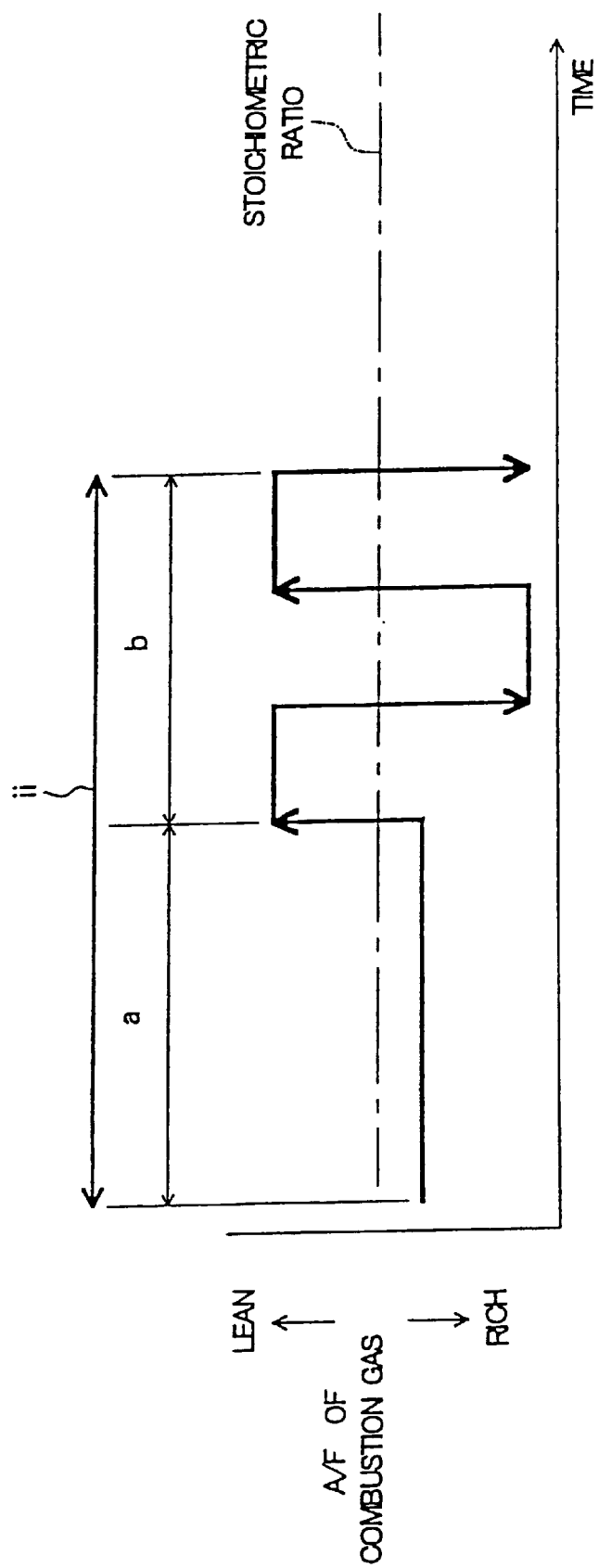
FIG. 15 is a combustion gas air-fuel ratio A/F versus time chart showing the recovery from the S-poisoning of the lean NOx catalyst during the operation of the engine in the sixth embodiment.

This will be described referring to FIG. 15.

a: In a case where there arises a necessity for reproducing the lean NOx catalyst such as performing the recovery from the S-poisoning of the leans NOx catalyst during the operation of the engine, and in a case where the temperature of the exhaust gas of the engine VI is low, the opening/closing valve 112a of the exhaust gas flow diverging device 112 opens the opening 110a of the catalyst bypass pipe 110 so that the low-temperature exhaust gas bypasses the catalyst converter 39. At this time, the combustion gas is flowed to the catalyst converter 39 via the combustion gas introducing passageway 99. Note that when the catalyst bypass pipe 110 is opened, not all of the exhaust gas is bypassed, but a portion thereof flows toward the catalyst converter 39.

The air-fuel ratio A/F of the combustion gas flowing across the catalyst converter 39 is in the rich region. Then, the air-fuel ratio is controlled so that a mixture composed of the combustion gas and a portion of the exhaust gas, which flows via the exhaust gas flow diverging device 112 toward the catalyst converter 39 disposed downstream of the exhaust gas flow diverging device 112, becomes the stoichiometric ratio.

b: With the rise in the temperature of the lean NOx catalyst, the temperature increases (over 500° C.) enough to enable the S-desorption and the oxidation of SOF of the lean NOx catalyst to be done, in other words, to make the lean NOx catalyst reproducible. Thereupon, the exhaust air-fuel ratio A/F in the combustion heater 17 is so controlled as to fluctuate between the lean region and the rich region with the stoichiometric ratio being centered. At that time, the air-fuel ratio of the mixture of the gas consisting of the engine exhaust gas and the combustion gas repeatedly becomes lean and rich.

Operational Effects of Sixth Embodiment

In the engine VI in accordance with the sixth embodiment, the exhaust pipe 42 includes the catalyst bypass pipe 110 which bypasses the catalyst converter 39 containing the lean NOx catalyst. The exhaust gas flow diverging device 112 diverges the flow of the exhaust gas toward either the catalyst bypass pipe 110 or the catalyst converter 39 in the exhaust pipe 42.

As for this flow-divergence, the exhaust gas is allowed to flow to the catalyst bypass pipe 110 only in such a case that the temperature of the exhaust gas is lower than the activation temperature of the lean NOx catalyst when making the request for the reproducing process of the lean NOx catalyst. In other cases, the exhaust gas is purified by the catalyst converter 39. That is, in the case of the low temperature of the exhaust gas when requested to execute the reproducing process of the lean NOx catalyst, the catalyst bypass pipe 110 is opened by operating the opening/closing valve 112a of the exhaust gas flow diverging device 112, thereby, except a portion of the exhaust gas which has leaked from the opening/closing valve 112a and flowing toward the catalyst converter 39, the exhaust gas is flowed toward the catalyst bypass pipe 110 without any flow to the catalyst converter 39.

It is therefore feasible to flow across the catalyst converter 39 solely the high-heat combustion gas which is emitted from the combustion heater 17 and flows via the combustion gas introducing passageway 99 extending toward the connecting point C5 positioned more downstream than the point C3 provided with the exhaust gas flow diverging device 112 in the exhaust pipe 42 as well as being positioned anterior to the catalyst converter 39.

Accordingly, even when the temperature of the exhaust gas is low, this low-temperature exhaust gas can be prevented from flowing across the lean NOx catalyst. Hence, it never happens that the temperature of the lean NOx catalyst is decreased by the low-temperature exhaust gas. As a result, the lean NOx catalyst can be easily activated.

Further, the catalyst temperature can be sufficiently raised up to the temperature enough to burn the SOF and the particulate matters at a high efficiency, and hence there can be well done the NOx reduction of the lean NOx catalyst, the recovery from the S-poisoning or from the SOF-poisoning and also the removal of the particulate matters.

Many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An internal combustion engine having a lean $NO_x$ catalyst, comprising:
   a combustion heater for raising temperatures of engine related elements;
   a lean $NO_x$ catalyst provided in an engine exhaust passageway for purifying an engine exhaust gas; and
   a combustion gas introducing passageway for introducing a combustion gas emitted by the combustion heater upstream of said engine and said lean $NO_x$ catalyst when making a request for a reproducing process of said lean $NO_x$ catalyst;
   wherein the time when making the request for the reproducing process of said lean $NO_x$ catalyst is at least one of the conditions of a time when requiring a $NO_x$ reduction of said lean $NO_x$ catalyst, a time when requiring a recovery from S-poisoning of said lean $NO_x$ catalyst and a recovery from SOF-poisoning thereof, and a time when requiring a removal of particulate matters from said lean $NO_x$ catalyst, and
   wherein when requiring the $NO_x$ reduction of said lean $NO_x$ catalyst, and when requiring the recovery from the S-poisoning of said lean $NO_x$ catalyst, an air-fuel ratio of the combustion gas emitted by the combustion heater is enriched as in the case of said lean $NO_x$ catalyst being in the reduction atmosphere air.

2. An internal combustion engine having a lean NOx catalyst according to claim 1, wherein said combustion gas introducing passageway is an EGR passageway.

3. An internal combustion engine having a lean NOx catalyst according to claim 1, wherein when a differential pressure between a pressure of an engine intake system and a pressure of an engine exhaust system is at a predetermined value or larger, the combustion gas emitted from said combustion heater is flowed to said combustion gas introducing passageway.

4. An internal combustion engine having a lean NOx catalyst according to claim 1, further comprising:
   a supercharger,
   wherein when the pressure of the engine intake system becomes over the predetermined value by dint of supercharging of said supercharger, the combustion gas emitted from said combustion heater is flowed to said combustion gas introducing passageway.

5. An internal combustion engine having a lean NOx catalyst according to claim 1, wherein when making the request for the reproducing process of said lean NOx catalyst, an output of said combustion heater becomes larger than an output thereof that was before making the request for the reproducing process of said lean NOx catalyst so as to increase heat of the combustion gas emitted from said combustion heater.

6. An internal combustion engine having a lean NOx catalyst according to claim 1, wherein said combustion heater allows the flow of the combustion gas through said engine intake passageway.

7. An internal combustion engine having a lean NOx catalyst according to claim 1, wherein said combustion gas introducing passageway is a bypass passageway extending to a point anterior to said lean NOx catalyst in the engine exhaust passageway and bypassing said engine body.

8. An internal combustion engine having a lean NOx catalyst according to claim 7, wherein said exhaust passageway includes:
   at least two or more of said lean NOx catalysts, disposed in parallel in a longitudinal direction of said exhaust passageway, to which the flow of the exhaust gas diverges alternately; and an exhaust gas flow diverging device for diverging the flow of the exhaust gas to said lean NOx catalysts, said exhaust gas flow diverging device cutting off the flow of the exhaust gas to said lean NOx catalyst being in a state of requiring the reproducing process, among two or more of said lean NOx catalysts.

9. An internal combustion engine having a lean NOx catalyst according to claim 1, wherein said exhaust passageway includes:
   a catalyst bypass pipe bypassing said lean NOx catalyst; and
   an exhaust gas flow diverging device for diverging a flow of the exhaust gas to said catalyst bypass pipe or to said lean NOx catalyst, said exhaust gas flow diverging device permitting the flow of the exhaust gas to said catalyst bypass pipe if a temperature of the exhaust gas is lower than an activation temperature of said lean NOx catalyst when making the request for the reproducing process of said lean NOx catalyst.

10. An internal combustion engine having a lean NOx catalyst according to claim 9, wherein of connecting points of said catalyst bypass pipe to said engine exhaust passageway which are formed when the catalyst bypass pipe bypasses said lean NOx catalyst, the connecting point positioned upstream is provided with said exhaust gas flow diverging device, and
   a connecting point more downstream than the connecting point where the exhaust gas flow diverging device is provided in the engine exhaust passageway is connected with said combustion gas introducing passageway which leads the combustion gas emitted from said combustion heater toward upstream of said lean NOx catalyst in said engine exhaust passageway at the time of requesting the reproducing process of said lean NOx catalyst.

* * * * *